United States Patent
Miyazawa et al.

(10) Patent No.: US 7,407,145 B2
(45) Date of Patent: Aug. 5, 2008

(54) CORE FOR MOLDING HOLLOW CERAMIC MOLDED BODY AND LIGHT EMITTING CONTAINER

(75) Inventors: Sugio Miyazawa, Kasugai (JP); Shinzo Hayashi, Obu (JP); Masaru Doi, Mie-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 301 days.

(21) Appl. No.: 11/202,705

(22) Filed: Aug. 12, 2005

(65) Prior Publication Data

US 2005/0287319 A1  Dec. 29, 2005

Related U.S. Application Data

(62) Division of application No. 10/311,773, filed as application No. PCT/JP02/03521 on Apr. 9, 2002, now Pat. No. 6,953,503.

(30) Foreign Application Priority Data

| Apr. 17, 2001 | (JP) | ............................. 2001-117669 |
| May 10, 2001 | (JP) | ............................. 2001-139564 |
| Oct. 24, 2001 | (JP) | ............................. 2001-325918 |

(51) Int. Cl.
   *B29C 33/52* (2006.01)
(52) U.S. Cl. ................... 249/62; 425/233; 425/286; 425/348 S; 425/467
(58) Field of Classification Search ................ 425/233, 425/282, 286, 338, 348 S, 351, 414, 467, 425/468, DIG. 44; 249/62
See application file for complete search history.

(56) References Cited

U.S. PATENT DOCUMENTS

| 3,971,376 | A | * | 7/1976 | Wichterle | ................. 424/423 |
| 4,375,947 | A | * | 3/1983 | Marcus | ................. 425/525 |
| 4,451,418 | A | | 5/1984 | Furuta et al. | |
| 4,950,152 | A | * | 8/1990 | Brun et al. | ................. 425/533 |
| 5,503,771 | A | | 4/1996 | Staley et al. | |
| 5,637,960 | A | | 6/1997 | Juengst et al. | |
| 5,915,451 | A | * | 6/1999 | Nakamura | ................. 164/165 |

(Continued)

FOREIGN PATENT DOCUMENTS

DE   199 36 517 C1   1/2001

(Continued)

OTHER PUBLICATIONS

U.S. Appl. No. 11/145,526, filed Jun. 3, 2005, Niimi

*Primary Examiner*—Yogendra Gupta
*Assistant Examiner*—Thu Khanh T Nguyen
(74) *Attorney, Agent, or Firm*—Burr & Brown

(57) ABSTRACT

A slurry for molding an article is provided wherein a source powder including at least one of a ceramic powder and a metal powder is dispersed, introduced into a forming mold, cured in the forming mold to form the molded article, and at least a part of the forming mold is degraded or dissolved in releasing the molded article from the forming mold. The major components of the slurry include the source powder, a dispersion medium and a gellifying agent, wherein the dispersion medium and the gellifying agent each contain an organic compound having a reactive functional group such that the slurry is cured by a reaction between the organic compound in the dispersion medium and the organic compound in the gellifying agent.

11 Claims, 18 Drawing Sheets

U.S. PATENT DOCUMENTS

| | | | |
|---|---|---|---|
| 6,095,788 A * | 8/2000 | van Manen et al. | 425/526 |
| 6,299,813 B1 * | 10/2001 | Brew et al. | 425/461 |
| 6,403,001 B1 | 6/2002 | Hayashi | |
| 6,634,410 B1 * | 10/2003 | Wilson et al. | 264/221 |
| RE38,396 E * | 1/2004 | Gellert | 425/548 |

FOREIGN PATENT DOCUMENTS

| | | |
|---|---|---|
| EP | 0 084 438 A2 | 7/1983 |
| EP | 1 006 552 A1 | 6/2000 |
| EP | 1 136 461 A2 | 9/2001 |
| HU | 185349 B | 1/1985 |
| HU | 220173 B | 11/2001 |
| JP | 48-061514 A | 8/1973 |
| JP | 48-091112 A | 11/1973 |
| JP | 50-014171 A | 2/1975 |
| JP | 56-109710 A | 8/1981 |
| JP | 57-201614 A | 12/1982 |
| JP | 5-077222 A | 3/1993 |
| JP | 6-057307 A | 3/1994 |
| JP | 6-064965 A | 3/1994 |
| JP | 7-047518 A | 2/1995 |
| JP | 7-107333 | 4/1995 |
| JP | 10-081183 | 3/1998 |
| JP | 2001-335371 | 12/2001 |
| WO | 99/62103 | 12/1999 |
| WO | 02-50857 A2 | 6/2002 |

* cited by examiner discharging of wax discharging of wax

← infection of slurry

CORE FOR MOLDING HOLLOW CERAMIC MOLDED BODY AND LIGHT EMITTING CONTAINER

CROSS REFERENCE TO RELATED APPLICATIONS

This application is a division of U.S. patent application Ser. No. 10/311,773, filed Dec. 18, 2002; now U.S. Pat. No. 6,953,503, now allowed, which is the National Stage of International Application No. PCT/JP02/03521, having an international filing date of Apr. 9, 2002, which designated the United States, the entireties of which are incorporated herein by reference.

FIELD OF THE INVENTION

The present invention relates to a method of producing a molded article formed from a molding source material made of ceramic powder, metal powder, or a mixture powder of these two powders, a slurry for molding constituting the molding source material, a core for molding constituting the forming mold used for the production of the molded article, a method of producing a core for molding, a hollow ceramic molded article produced by the method of producing a molded article, and a discharge vessel formed from a precursor made of a hollow ceramic molded article.

BACKGROUND OF THE INVENTION

Regarding the molding methods for producing molded components of various molded articles using a molding source material made of ceramic powder, metal powder, or a mixture powder of these two powders, there are various molding methods such as cast-molding, press-molding, and injection molding. Basically, these molding methods are production methods in which a ceramic powder, a metal powder, or a mixture powder of these two powders is put into a forming mold in a dispersed state and cured in the forming mold to form a molded article, and the formed molded article is released to obtain a molded article. In the production methods, suitable molding methods are selected in accordance with the form of the molding source material to be used, the shape of the molded article to be produced, and the degree of complexity of the structure.

In the meantime, the produced molded articles are greatly diversified, varying from those having a simple shape or structure to those having a complex shape or structure, from those having a small thickness to those having a large thickness, and from those having a high dimension precision to those having a low dimension precision with regard to these, depending on the required properties of the molded components. In the case of producing these molded components, whichever molding method is adopted, it is important that the molded articles can be formed with good dimension precision in a forming mold and that the formed molded articles can be released easily without any damage from within the forming mold. In order to deal with these matters, with a premise to adopt an accurate and appropriate molding method, it is required to give full consideration to the molding source materials and forming molds. Further, if the molded components have a special shape or structure, these considerations will be all the more important.

If the molded components have a complex shape or structure, depending on the degree of complexity in the shape or structure, there are problems such as the difficulty of forming the molded articles in an ordinary mold with the use of an ordinary molding source material, the difficulty of releasing the molded articles from within the forming mold, the decrease in the dimension precision of the shape or structure, the difficulty of densifying the molded articles, and the possibility of generating cracks in the case of the molded articles having a large thickness.

As one means to deal with these problems, it is known to adopt the gel-cast method which is one cast-molding method. In Tokkai No. 2001-335371 which is a Japanese Laid-Open Patent Publication, a gel-cast method giving consideration to slurries for molding constituting the molding source materials is disclosed.

The gel-cast method makes use of a source material powder made of ceramic powder, metal powder, or a mixture powder of these two powders as well as a dispersion medium and a slurry containing a gellifying agent, as a molding source material. It is a method in which, after the slurry is injected into a forming mold, the slurry is held at a predetermined temperature in the presence of a cross-linking agent for curing to form a molded article. Since the gel-cast method involves injection of a before-cure slurry in a highly fluid state into the forming mold, the gel-cast method has great advantages such as the facility of forming molded articles having complex shapes or structures and the property that the formed molded articles have sufficient strength to withstand the handling by curing of the slurry.

In a conventional gel-cast method, the slurry to be used is prepared by the addition and dispersion of a source material powder and a gellifying agent containing a prepolymer such as polyvinyl alcohol, epoxy resin, or phenolic resin as a major component, into a dispersion medium. The slurry prepared in such a manner is injected into a forming mold made of metal or the like for curing. Here, a cross-linking agent is added to the slurry injected into the forming mold, whereby the slurry is cured to form a molded article by cross-linking reaction between the added cross-linking agent and the gellifying agent.

In the meantime, in the conventional gel-cast method, since the prepolymer constituting the gellifying agent is present in a diluted state in the non-reactive dispersion medium, it is necessary to use a large amount of prepolymer and cross-linking agent in order to attain full curing of the slurry. If this means is adopted, the viscosity of the slurry will be high, thereby deteriorating the fluidity of the slurry.

As a result of this, it is difficult to disperse both of the gellifying agent and the cross-linking agent uniformly in the slurry. This makes it impossible to cure the whole slurry uniformly and increases a possibility that cracks may be generated in the formed molded article at the time of drying or baking. Further, the workability requested in the work of injecting the slurry into the forming mold is not sufficient. In addition, it is difficult to make the slurry extend uniformly into the forming, so that the density of the formed molded article will not be as intended, and the molded article will have a large shrinkage at the time of drying or at the time of baking. This increases a possibility that cracks may be generated at the time of drying or baking.

Further, since the slurry contains a large amount of non-reactive dispersion medium, prepolymer, and cross-linking agent, the molded article formed with the use of the slurry as a molding source material contains a large amount of components that are evaporated and/or lost by burning. For this reason, a large shrinkage occurs in the formed molded article at the time of drying and baking. This will be a large factor in causing deformation of the molded article, generation of cracks, and poor sintering.

Furthermore, since the conventional gel-cast method adopts a forming mold made of metal as a forming mold and when the formed molded article is released from the forming mold, there is a possibility that, particularly in the case of producing a molded article having a fine shape or structure or having a complex shape or structure, the portions with the fine or complex shape or structure of the molded article to be released may be damaged at the time of releasing. In addition, if the forming mold has a portion with an undercut shape or structure, the molded article formed within the forming mold cannot be released without being damaged.

On the other hand, as a molded article having a special shape or structure and used for special purposes, a hollow ceramic molded article having a hollow body part and a narrow pipe part can be mentioned. The sintered body formed by baking the hollow ceramic molded article is used as a hollow ceramic component that have various functional components such as a discharge vessel for a high-pressure electric discharging lamp. Generally, in the hollow ceramic molded article which is a precursor of the hollow ceramic component such as a discharge vessel, the body part and the narrow pipe part are formed as separate parts, and these two are joined with each other and assembled to construct the hollow ceramic molded article.

In recent years, in order to improve the function of the hollow ceramic components and to eliminate the cumbersome work of assembling the construction members in forming the hollow ceramic molded articles, an integral-type hollow ceramic molded article integrally having a body part and a narrow pipe part as well as a hollow ceramic component formed from a precursor made of the ceramic molded article are proposed in International Patent Application No. PCT/JP99/02777 (International Publication No. WO99/62103).

In the hollow ceramic component, from the viewpoint of functions, it is demanded that the inner circumferential surfaces of the body part and the narrow pipe part as well as the boundary parts of these are as smooth as possible and that the wall part of the body part is formed to have a set thickness so as not to give a varied volume. These demands are of course demanded in integral-type hollow ceramic components as well, so that a hollow ceramic component integrally having a body part and a narrow pipe part that can deal with these demands as well as a suitable method of producing the hollow ceramic component are demanded.

As conventional methods for producing a hollow ceramic molded article constituting a precursor of such an integral-type hollow ceramic component, there are the blow molding method disclosed in Japanese Laid-Open Patent Publication No. 10-81183/1998, the cast-molding method disclosed in Japanese Laid-Open Patent Publication No. 07-107333/1995, the reduced-pressure molding method disclosed in the aforementioned International Patent Application, and others. However, in any of these production methods, there are problems in producing an integral-type hollow ceramic component that can deal with each of the aforementioned demands and a hollow ceramic molded article constituting its precursor.

In other words, among these production methods, the blow molding method is a method in which a plastic pipe-shaped molded article is set between two molds of a forming mold, and a pressurized medium such as pressurized air is blown through an opening on one end of the molded article, so as to let the plastic molded article expand from the inside to the molding surface sides of the two molds. According to the blow molding method, a hollow ceramic molded article having an outer shape that conforms to the molding surfaces of the two molds of the forming mold is molded, and a hollow ceramic component can be obtained by baking this. However, by the blow molding method, it is difficult to control the inner shape of the ceramic molded article, so that the wall part of the body part will unlikely have a set thickness and also increases a possibility of lacking in uniformity.

Further, the cast-molding method is a method in which an aqueous slurry is injected through an opening of a casting mold so as to coat the molding surface of the casting mold with the slurry by utilizing the water absorption of the casting mold such as a plaster mold, and a superfluous slurry is discharged from the casting mold. In the cast-molding method as well, a hollow ceramic molded article having an outer shape that conforms to the molding surface of the casting mold can be molded. However, in the same manner as in the blow molding method, it is difficult to control the inner shape of the ceramic molded article, so that the wall part of the body part will unlikely have a set thickness and also increases a possibility of lacking in uniformity.

Furthermore, the reduced-pressure molding method is a method in which a plastic pipe-shaped molded article is set between the two molds of a forming mold and a negative pressure is imparted to a gap between the inner circumferences of the two molds and the outer circumference of the molded article so as to let the plastic molded article expand to the molding surface sides. By the reduced-pressure molding method as well, one can mold a hollow ceramic molded article having an outer shape that conforms to the molding surfaces of the two molds of the forming mold. However, in the same manner as the blow molding method and the cast-molding method, it is difficult to control the inner shape of the ceramic molded article, so that the wall part of the body part will unlikely have a set thickness and also increases a possibility of lacking in uniformity.

SUMMARY OF THE INVENTION

The present invention relates to a method of producing a molded article, a method of producing a molded article based on the gel-cast method, a method of producing a hollow ceramic molded article based on the gel-cast method, a slurry for molding, a core for molding constituting a forming mold, a method of producing a core for molding, a hollow molded article, and a discharge vessel.

The first object of the present invention is to produce a molded article having a fine shape or structure or a molded article having a complex shape or structure without accompanying a damage at the time of releasing and with good dimension precision. Further, the second object of the present invention is to produce a hollow ceramic molded article having a special shape and a special structure without accompanying a damage at the time of releasing and with good dimension precision. In the present invention, the slurry for molding constituting the molding source material, the core for molding, the hollow molded article, and others are improved in order to achieve the first object and the second object of the present invention.

In the present invention, the first object thereof is achieved by using a mold at least a part of which is made of a degradable material or a soluble material as the forming mold and, with a view to the gellifying casting method as a molding method, allowing a gellifying agent constituting the slurry, which is a molding source material, to react not with a cross-linking agent but with a dispersion medium, so as to cure the slurry.

Further, in the present invention, the second object thereof is achieved by using a core for molding that can accurately and appropriately control the inner shape of the molded article at the time of molding the hollow ceramic molded article with a view to the lost wax molding method that uses a wax molded article as a core for molding.

In order to achieve these objects, the present invention provides a method of producing a molded article, a method of producing a molded article based on the gel-cast method, a method of producing a hollow ceramic molded article based on the gel-cast method, a slurry for molding, a core for molding, a method of producing a core for molding, a hollow molded article, and a discharge vessel.

The first aspect of the present invention relates to a method of producing a molded article. The first one of the methods for producing a molded article according to the present invention is a method of producing a molded article in which a ceramic powder, a metal powder, or a mixture powder of these two powders is put in a dispersed state into a forming mold and cured in the forming mold to form a molded article, and the formed molded article is released to obtain the molded article, characterized in that a mold at least a part of which is formed with a degradable material or a soluble material is adopted as the forming mold, and in that at least a part of the forming mold is degraded or dissolved in releasing the molded article.

The second one of the methods for producing a molded article according to the present invention is based on the first production method and is a method of producing a molded article in which a slurry containing a ceramic powder, a metal powder, or a mixture powder of these two powders together with a dispersion medium and a gellifying agent is adopted as a molding material of the molded article, the slurry is cured in the forming mold to form a molded article, and the formed molded article is released to obtain the molded article, characterized in that a mold at least a part of which is formed with a degradable material or a soluble material is adopted as the forming mold, and in that at least a part of the forming mold is degraded or dissolved in releasing the molded article.

The third one of the methods for producing a molded article according to the present invention is based on the first production method and is a method of producing a molded article in which a slurry containing a ceramic powder, a metal powder, or a mixture powder of these two powders together with a dispersion medium, a gellifying agent, and a dispersing agent is adopted as a molding material of the molded article, the slurry is cured in the forming mold to form a molded article, and the formed molded article is released to obtain the molded article, characterized in that a mold at least a part of which is formed with a degradable material or a soluble material is adopted as the forming mold, and in that at least a part of the forming mold is degraded or dissolved in releasing the molded article.

In the second and third production methods of the methods for producing a molded article according to the present invention, various modes shown below can be adopted. Namely, in these methods of producing a molded article, one can adopt a mode in which a mold composed of a core for molding at least a part of which is formed with a degradable material or a soluble material and a split-type outer mold formed with a non-degradable and non-soluble material is adopted as the forming mold, the slurry is injected into a space part formed by the outer mold and the core for molding, the slurry is cured in the space part to form a molded article, and at least a part of the core for molding is degraded or dissolved in releasing the molded article.

Also, in these methods of producing a molded article, one can adopt a mode in which a mold composed of a core for molding at least a part of which is formed with a degradable material or a soluble material and an outer mold at least a part of which is formed with a degradable material or a soluble material is adopted as the forming mold, the slurry is injected into a space part formed by the outer mold and the core for molding, the slurry is cured in the space part to form a molded article, and at least a part of the outer mold and the core for molding is degraded or dissolved in releasing the molded article.

In the methods of producing a molded article according to these modes, one can select a wax or waxy substance as the soluble material constituting at least a part of the forming mold. Further, one can add a polymer having a capability of curing the slurry into the slurry to be adopted.

The second aspect of the present invention relates to methods of producing a hollow ceramic molded article.

The first one of the methods for producing a hollow ceramic molded article which are the second invention according to the present invention is a method of producing a hollow ceramic molded article integrally having a hollow body part and a narrow pipe part, in which a slurry containing a ceramic powder, a metal powder, or a mixture powder of these two powders together with a dispersion medium and a gellifying agent, the slurry being made by optional addition of a polymer as a dispersing agent and/or a curing aid in accordance with the needs, is adopted as a molding material of the hollow ceramic molded article, and a mold made of a core for molding at least a part of which is formed with a degradable material or a soluble material and a split-type outer mold formed with a non-degradable and non-soluble material is adopted as the forming mold.

Here, the first method of producing the hollow ceramic molded article is characterized in that the slurry is injected into a space part formed by the outer mold and the core, the slurry is cured in the space part to form a hollow ceramic molded article, and at least a part of the core for molding is degraded or dissolved in releasing the molded article.

The second one of the methods for producing a hollow ceramic molded article which are the second invention according to the present invention, in the same manner as the first production method, is a method of producing a hollow ceramic molded article integrally having a hollow body part and a narrow pipe part, in which a slurry containing a ceramic powder, a metal powder, or a mixture powder of these two powders together with a dispersion medium and a gellifying agent, the slurry being made by optional addition of a polymer as a dispersing agent and/or a curing aid in accordance with the needs, is adopted as a molding material of the hollow ceramic molded article; a mold made of a core for molding at least a part of which is formed with a degradable material or a soluble material and an outer mold formed with a degradable material or a soluble material is adopted as the forming mold; the slurry is injected into a space part formed by the outer mold and the core; the slurry is cured in the space part to form a hollow ceramic molded article; and at least a part of the core and the outer mold is degraded or dissolved in releasing the molded article.

Here, in the first and second methods of producing the hollow ceramic molded article, a core made of a wax molded article or molded article made of waxy substance having an outer shape corresponding to an inner shape of the body part of the hollow ceramic molded article and a solid pin or a hollow pin having an outer shape corresponding to an inner shape of the narrow pipe part and joined to the wax molded article or molded article made of waxy substance to protrude from the molded article can be adopted as the core for molding; and the pin constituting the core can be drawn out from the wax molded article or molded article made of waxy substance and taken out from the outer mold in releasing the hollow ceramic molded article, and thereafter the wax molded article or molded article made of waxy substance in the molded hollow ceramic molded article can be discharged by being heated and melted in a state in which the molded article remains in the outer mold or in a state in which the molded article is released from the outer mold.

In these methods of producing the hollow ceramic molded article, one can adopt a construction in which an injection inlet for injecting the slurry into the space part of the forming mold is positioned to face an outer circumference of the pin constituting the core for molding in the forming mold. Further, in the case where the hollow ceramic molded article to be molded has at least two narrow pipe parts, one can adopt a construction in which the core for molding includes a pin corresponding to these narrow pipe parts.

The third aspect of the present invention relates to a slurry for molding which is a source material for molding.

The first one of the slurries for molding according to the present invention is a slurry for molding adopted in a method of producing a molded article in which a ceramic powder, a metal powder, or a mixture powder of these two powders is put in a dispersed state into a forming mold and cured in the forming mold to form a molded article, and at least a part of the forming mold is degraded or dissolved in releasing the formed molded article from the forming mold.

Here, the slurry for molding is characterized in that the slurry for molding contains the ceramic powder, the metal powder, or the mixture powder of these two powders together with a dispersion medium and a gellifying agent as major constituent components; the dispersion medium and the gellifying agent contain organic compounds having a reactive functional group; and the slurry for molding is cured by reaction between the organic compound in the dispersion medium and the organic compound in the gellifying agent.

The second one of the slurries for molding which are the third invention according to the present invention, in the same manner as the first slurry for molding, is a slurry for molding adopted in a method of producing a molded article in which a ceramic powder, a metal powder, or a mixture powder of these two powders is put in a dispersed state into a forming mold and cured in the forming mold to form a molded article, and at least a part of the forming mold is degraded or dissolved in releasing the formed molded article from the forming mold.

Here, the slurry for molding is characterized in that the slurry contains the ceramic powder, the metal powder, or the mixture powder of these two powders together with a dispersion medium, a gellifying agent, and a dispersing agent as major constituent components; the dispersion medium, the gellifying agent, and the dispersing agent contain organic compounds having a reactive functional group; and the slurry is cured by reaction of the organic compound in the dispersion medium and/or the organic compound in the dispersing agent with the organic compound in the gellifying agent.

In the slurry for molding according to the present invention, one can allow a polymer to be contained as a curing aid, and various modes such as shown below can be adopted. Namely, in the slurry for molding, one can adopt a construction in which the source material powder has a concentration of 40 vol % or more, and has a viscosity at 25° C. of 5 ps or less, and a construction in which the slurry contains at least one kind of a component selected from Mg, Y, Zr, Sc, La, Si, B, Na, Cu, Fe, Ca, and oxides of these, and contains the component within a range from 0.02 wt % to 0.15 wt %.

Regarding the dispersion medium constituting the slurry for molding, one can adopt a construction in which the dispersion medium contains an organic compound having at least two reactive functional groups, a construction in which the dispersion medium contains the reactive functional group at 60 mass % or more, and a construction in which the dispersion medium has a viscosity at 20° C. of 0.2 ps or less.

Regarding the gellifying agent constituting the slurry for molding, one can adopt a construction in which the gellifying agent has a viscosity at 20° C. of 30 ps or less, a construction in which the gellifying agent contains a 4,4'-diphenylmethane diisocyanate (MDI) series isocyanate based on a chemical structure shown in the following formula (1), and a construction in which the gellifying agent contains a hexamethylene diisocyanate (HDI) series isocyanate based on a chemical structure shown in the following formula (2).

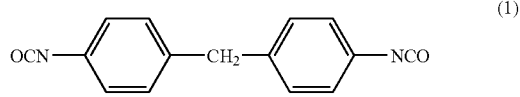

$$\text{OCN}-\!\!\!\!\bigcirc\!\!\!\!-\text{CH}_2-\!\!\!\!\bigcirc\!\!\!\!-\text{NCO} \quad (1)$$

$$\text{OCN}-(\text{CH}_2)_6-\text{NCO} \quad (2)$$

Regarding the dispersion medium and the gellifying agent constituting the slurry for molding, one can adopt a construction in which the dispersion medium contains an organic compound having at least two ester bonds; and the gellifying agent contains an organic compound having an isocyanate group, an isothiocyanate group, or both of these groups.

Regarding the dispersing agent constituting the slurry for molding, one can adopt a construction in which the dispersing agent contains an organic compound having a reactive functional group, the reactive functional group reacting with the organic compound in the dispersion medium or gellifying agent, and a construction in which the content of the dispersing agent relative to the source material powder constituting the slurry is within a range from 0.1 wt % to 5 wt %.

The fourth aspect of the present invention relates to a core for molding. The first one of the cores for molding which are the fourth invention according to the present invention is a core for molding constituting a forming mold to be used for molding a hollow ceramic molded article integrally having a hollow body part and a narrow pipe part, characterized in that the core for molding includes a wax molded article or molded article made of waxy substance having an outer shape corresponding to an inner shape of the body part and a pin having an outer shape corresponding to an inner shape of the narrow pipe part and joined to the wax molded article or molded article made of waxy substance to protrude from the molded article.

Further, the second one of the cores for molding which are the fourth invention according to the present invention is a core for molding to be used for simultaneously molding a plurality of hollow ceramic molded articles integrally having a hollow body part and a narrow pipe part, characterized in that the core for molding includes a plurality of wax molded articles or molded articles made of waxy substance having an outer shape corresponding to an inner shape of the body part and a long pin having an outer shape corresponding to an inner shape of the narrow pipe part and serially piercing through the wax molded articles or molded articles made of waxy substance for joining; and the pin is a pipe-shaped hollow pin and includes ejection outlets of the wax or waxy substance at portions corresponding to joining portions of the wax molded articles or molded articles made of waxy substance.

In the aforementioned first core for molding, various modes such as shown below can be adopted. Namely, regarding the wax or waxy substance of the molded article constituting the core for molding, one can adopt a construction in which the wax or waxy substance has a melting point within a range from 30° C. to 80° C., a construction in which the wax or waxy substance has a viscosity at melting of 10 ps or less, and a construction in which the wax or waxy substance has a volume change ratio by molten-solid phase transition of 5% or less.

Regarding the pin constituting the core for molding, one can adopt a construction in which the pin is joined to the molded article in a state of piercing through the wax molded article or molded article made of waxy substance, a construction in which the pin is joined to the molded article in a state of being planted into the wax molded article or molded article made of waxy substance, a construction in which the pin is a solid pin or a pipe-shaped hollow pin, a construction in which the hollow pin is closed on one end or on both ends, a construction in which the hollow pin is open on at least one end and includes an ejection outlet of the wax or waxy substance at a portion corresponding to a joining portion of the wax molded article or molded article made of waxy substance.

Further, in the aforementioned second core for molding, various modes such as shown below can be adopted. Namely, regarding the wax or waxy substance of the molded articles constituting the core for molding, one can adopt a construction in which the wax or waxy substance has a melting point within a range from 30° C. to 80° C., a construction in which the wax or waxy substance has a viscosity at melting of 10 ps or less, and a construction in which the wax or waxy substance has a volume change ratio by molten-solid phase transition of 5% or less.

Regarding the hollow pin constituting the core for molding, one can adopt a construction in which the pin is closed on one end or on both ends, a construction in which the pin is open on at least one end and includes ejection outlets of the wax or waxy substance at portions corresponding to joining portions of the wax molded articles or molded articles made of waxy substance, a construction in which the pin has a surface roughness (Ra) of 0.1 to 3.2, a construction in which the pin has an adhesion strength of 0.1 kg to 2 kg to the wax molded article or molded article made of waxy substance, and a construction in which a gap formed in the wax molded article or molded article made of waxy substance by drawing out the pin is at least 1 vol % of the volume occupied by the molded article.

The fifth aspect of the present invention relates to a method of producing a core for molding to be used for molding a hollow ceramic molded article integrally having a hollow body part and a narrow pipe part, the core including a wax molded article or molded article made of waxy substance having an outer shape corresponding to an inner shape of the body part and a molding pin having an outer shape corresponding to an inner shape of the narrow pipe part and joined to the wax molded article or molded article made of waxy substance to protrude from the molded article.

Here, the first one of the methods for producing a core for molding which are the fifth invention according to the present invention is characterized in that a pin without having an ejection outlet of the wax or waxy substance is adopted as the molding pin; a mold having a cavity corresponding to an outer shape of the wax molded article or molded article made of waxy substance and having a space part being in communication with the cavity for housing the pin is adopted as a forming mold; and the wax or waxy substance in a molten state is supplied to the cavity through an injection passageway of the wax or waxy substance disposed in the forming mold in a state in which the pin is housed in the forming mold.

Further, the second one of the methods for producing a core for molding which are the fifth invention according to the present invention is characterized in that a hollow pin having an ejection outlet of the wax or waxy substance is adopted as the molding pin; a mold having a cavity corresponding to an outer shape of the wax molded article or molded article made of waxy substance and having a space part being in communication with the cavity for housing the pin is adopted as a forming mold; and the wax or waxy substance in a molten state is injected through an inner hole of the pin and supplied from the ejection outlet disposed in the pin to the cavity in a state in which the pin is housed in the forming mold.

The sixth aspect of the present invention relates to a method of producing a core for molding to be used for simultaneously molding a plurality of hollow ceramic molded articles integrally having a hollow body part and a narrow pipe part. The method of producing a core for molding is a method of producing a core for molding in which the core for molding includes a plurality of wax molded articles or molded articles made of waxy substance having an outer shape corresponding to an inner shape of the body part and a long pin having an outer shape corresponding to an inner shape of the narrow pipe part and serially piercing through the wax molded articles or molded articles made of waxy substance for joining, the pin being a pipe-shaped hollow pin and including ejection outlets of the wax or waxy substance at portions corresponding to joining portions of the wax molded articles or molded articles made of waxy substance.

Here, the core for molding is characterized in that a mold serially having a plurality of cavities corresponding to an outer shape of the wax molded articles or molded articles made of waxy substance and having a space part being in communication with these cavities for housing the long hollow pin is adopted as a forming mold; and the wax or waxy substance in a molten state is injected through an inner hole of the pin and supplied from the ejection outlets disposed in the pin to the cavities in a state in which the pin is housed in the forming mold.

The seventh aspect of the present invention relates to a hollow ceramic molded article. The hollow ceramic molded article according to the present invention is a hollow ceramic molded article integrally having a hollow body part and a narrow pipe part and molded with the use of a core for molding, characterized in that the body part has a smooth circumferential surface shape controlled by the wax molded article or molded article made of waxy substance that the core for molding has; and the narrow pipe part has a smooth circumferential surface shape controlled by the pin that the core for molding has.

The eighth aspect of the present invention relates to a discharge vessel formed from a precursor made of a hollow ceramic molded article. The discharge vessel according to the present invention is a discharge vessel for high-pressure electric discharging lamp and is a hollow ceramic component of light-transmitting ceramic quality made by baking a hollow ceramic molded article integrally having a hollow body part and a narrow pipe part and molded with the use of a core for molding, the body part having a smooth inner circumferential surface controlled by the wax molded article or molded article made of waxy substance of the core for molding, the narrow pipe part having a smooth inner circumferential surface controlled by the pin of the core for molding, characterized in that the body part is constructed to be an electric discharging space; and the narrow pipe part is constructed to be an insertion space for inserting an electrode member.

Thus, the present invention includes the aforementioned first to eighth aspects, wherein the first aspect of the present invention relates to a method of producing a molded article, the second aspect relates to a method of producing a hollow ceramic molded article, the third aspect relates to a slurry for molding which is a molding source material, the fourth aspect relates to a core for molding constituting a forming mold, the fifth and sixth aspects relate to methods of producing a core for molding, the seventh aspect relates to a hollow ceramic molded article, and the eighth aspect relates to a discharge vessel.

Here, the words "wax molded articles or articles made of waxy substance" and the words "wax or waxy substance" are cumbersome, wax molded articles or molded articles made of waxy substance will be simply referred to as "wax molded articles", and wax or waxy substance will be simply referred to as "wax" in the descriptions concerning the present invention. Therefore, the words "wax molded articles" to be used in the following descriptions shall mean wax molded articles and/or molded articles made of waxy substance, and the word "wax" shall mean wax and/or waxy substance.

In the method of producing a molded article which is the first aspect according to the present invention, at least a part of the forming mold is degraded or dissolved when the molded article formed in the forming mold is released from the forming mold. For this reason, according to the method of producing a molded article, the molded article can be released without giving any damage to the molded article by degrading or dissolving the portions of the forming mold that hinder the releasing, even in the case of a molded article in which the shape or structure is complex or fine, or in the case of a molded article having a portion of undercut.

Further, in the method of producing a molded article, the second production method adopts the gel-cast method in which a slurry that is gellified in the forming mold is used as a molding source material. For this reason, according to the method of producing a molded article, a molded article in which the shape or structure is complex or fine can be formed easily in the forming mold, and the molded article can be released without giving any damage to the molded article by degrading or dissolving the portions of the forming mold that hinder the releasing when the molded article is released.

The method of producing a hollow ceramic molded article according to the second aspect of the present invention adopts the gel-cast method in which a slurry that is gellified in the forming mold is used as a molding source material in the production of a hollow ceramic molded article with a special shape or structure integrally having a hollow body part and a narrow pipe part. For this reason, according to the method of producing a molded article, a hollow ceramic molded article integrally having a hollow body part and a narrow pipe part, which is a molded article of a special structure having a complex and fine shape or structure, can be formed easily in the forming mold, and the molded article can be released without giving any damage to the hollow ceramic molded article by degrading or dissolving the portions of the forming mold that hinder the releasing when the hollow ceramic molded article is released.

In the methods of producing the hollow ceramic molded article, the second production method thereof adopts, as the core for molding constituting the forming mold, a core for molding made of a wax molded article having an outer shape corresponding to the inner shape of the body part of the hollow ceramic molded article and a solid pin or hollow pin having an outer shape corresponding to the inner shape of the narrow pipe part and joined to the wax molded article to protrude from the wax molded article.

This allows that, if the core is adopted as the core for molding constituting the forming mold, in releasing the hollow ceramic molded article in the forming mold, the pin constituting the core for molding is drawn out from the wax molded article and taken out from the outer mold, and thereafter the wax molded article in the hollow ceramic molded article is discharged by being heated and melted in a state in which the molded article remains in the outer mold or in a state in which the molded article is released from the outer mold.

According to the method of producing the hollow ceramic molded article, by allowing the shape of the wax molded article constituting the core for molding to accurately correspond to the inner shape of the body part of the ceramic molded article in advance, the shapes of the inside and outside in the body part of the hollow ceramic molded article can be accurately controlled, and by discharging the wax molded article in a molten state after molding the hollow ceramic molded article, a hollow ceramic molded article having a wall part with a set uniform thickness can be formed.

In this case, since a slurry made of ceramic powder containing a dispersion medium and a gellifying agent is adopted as the molding material and means for injecting the slurry into a space part formed on the outer circumference of the core for molding in the cavity of the forming mold for gellifying and curing is adopted, there is no presence of voids in the formed hollow ceramic molded article, and the wax is prevented from penetrating into the inner wall of the ceramic molded article to deteriorate the surface roughness of the inner circumferential surface of the body part in discharging the wax molded article by melting.

Further, in the method of producing the hollow ceramic molded article, means for drawing out the pin from the wax molded article is adopted prior to melting the wax molded article in discharging the wax molded article constituting the core for molding. After the pin is drawn out from the wax molded article, a gap corresponding to the volume of the pin and being in communication with the outside remains in the inside of the ceramic molded article. Therefore, the stress imposed upon the body part of the hollow ceramic molded article, which is caused by thermal expansion in heating and melting the wax molded article, is alleviated, so that there will be no generation of local deformation or cracks in the body part, and the body part keeps a smooth inner circumferential surface shape.

Further, in discharging the wax molded article by melting, the communicating part formed by drawing out the pin (the narrow pipe part of the component) can be used. This allows the molten wax to be discharged speedily to the outside. The number of the formed communicating parts is determined by the shape or the number of pins that are put to use. However, if a plurality of communicating parts are present, a pressure can be imparted to the molten wax from the communicating part on one end so as to extrude the molten wax from the communicating part on the other end, thereby giving an advantage that the molten wax is discharged speedily to the outside.

The slurry for molding according to the third aspect of the present invention is a slurry that is suitable for adoption in each of the aforementioned methods for producing the molded article according to the present invention. The first one of the slurries for molding is a slurry containing a ceramic powder, a metal powder, or a mixture powder of these two powders together with a dispersion medium and a gellifying agent as major constituent components, and the second one of the slurries is a slurry obtained by addition of a dispersing agent to these constituent components. In these slurries for molding, the dispersion medium and the gellifying agent, and in some cases the dispersion agent, contain an organic compound having a reactive functional group, whereby the slurries are cured by reaction of the organic compound in the dispersion medium and/or the organic compound in the dispersing agent with the organic substance in the gellifying agent.

These slurries for molding according to the present invention give a high reaction efficiency of gellifying reaction, have a low viscosity and a high fluidity, and are highly uniform slurries in which the constituent components are mutually uniformly dispersed. For this reason, if the slurries for molding are adopted as a molding source material, the work of injecting the slurry for molding into the forming mold is improved, and the slurry extends well to the inside of the forming mold, so that a molded article having a complex shape or structure, a molded article having a fine shape or structure, and the like can be produced with good precision. Also, the obtained molded article has a large and uniform density and hardness, so that when the molded article is dried or baked, the generation of cracks is prevented or restrained.

Further, regarding the slurries for molding, the content of the components that are evaporated or lost by burning can be restrained to be low due the construction components, leading to decrease in the components that are evaporated or lost by burning at the time of drying or baking in the obtained molded article. This leads to reduction of shrinkage ratio at the time of drying or baking the molded article, improvement in the drying or baking efficiency, and prevention of the generation of cracks at the time of drying or baking.

In the method of producing a molded article that adopts the slurry for molding as a molding source material, a forming mold in which at least a part of the forming mold is formed with a degradable material or a soluble material is adopted. There is a possibility that the forming mold cannot withstand the pressure of injecting the slurry depending on the means for injecting the slurry. However, since the slurry for molding has a low viscosity and a high fluidity, the pressure of injecting the slurry into the forming mold can be restrained to be low, so that there will not be any possibility that the forming mold may be broken at the time of injecting the slurry into the forming mold.

Here, in the slurry for molding, in correspondence with the methods of producing a molded article, various modes can be adopted as described above. This allows that each of the slurries for molding exhibits its own functions and effects, as will be described in detail in the section of "Detailed Description of the Invention" that will be described later.

The core for molding according to the fourth aspect of the present invention is a core that constitutes a forming mold for producing the aforementioned hollow ceramic molded article, and the first one of the cores for molding is a core for molding that is used for molding a hollow ceramic molded article integrally having a hollow body part and a narrow pipe part.

The core for molding has a construction including a wax molded article having an outer shape corresponding to the inner shape of the body part and a pin having an outer shape corresponding to the inner shape of the narrow pipe part and joined to the wax molded article to protrude from the wax molded article.

In the case of molding a hollow ceramic molded article using the core for molding, the body part of the hollow ceramic molded article is formed in a cavity of the forming mold on the outer circumferential surface side of the wax molded article of the core for molding, and the narrow pipe part of the hollow ceramic molded article is formed in the cavity of the forming mold on the outer circumferential surface side of the pin of the core for molding.

In this case, the wax molded article of the core for molding is involved in forming the body part of the hollow ceramic molded article, and the wax molded article controls the inner circumferential surface shape of the body part accurately to the outer circumferential surface shape of the wax molded article. Also, in this case, the pin of the core for molding is involved in forming the narrow pipe part of the hollow ceramic molded article, and the pin controls the inner circumferential surface shape of the narrow pipe part accurately to the outer circumferential surface shape of the pin. The core for molding functioning in this manner can have a construction in which the pin is joined to the wax molded article in a state in which the pin is piercing through the wax molded article or a construction in which the pin is joined to the wax molded article in a state in which the pin is planted into the wax molded article.

It does not matter whether the pin constituting the core for molding is a solid pin or a pipe-shaped hollow pin; however, if a hollow pin is adopted, it gives good functions and effects to the wax molded article formed on the outer circumference of the hollow pin. Namely, in forming the core for molding, a heated and melted wax is injected onto the outer circumferential side of the pin in the cavity of the forming mold. At this moment, the wax molded article gradually shrinks to pinch the pin, and as a result of this, a stress caused by the shrinkage acts on the wax molded article, thereby increasing a possibility that cracks may be generated. In this case, if the pin is a hollow pin, the hollow pin is deflected by the pinching force imparted by the wax molded article to alleviate the pinching force, thereby alleviating the stress to the wax molded article. This prevents the generation of cracks in the wax molded article.

Further, if a hollow pin is adopted as the pin constituting the core for molding, the hollow pin may be a pin closed on one end or on both ends, or may be a pin open on at least one end and having an ejection outlet of the wax at a portion corresponding to the joining portion of the wax molded article. If a pin being open on at least one end and having an ejection outlet of the wax at a portion corresponding to the joining portion of the wax molded article is adopted as the hollow pin, molten wax can be supplied from the ejection outlet through an inner hole of the pin as a means for injecting the heated and melted wax onto the outer circumferential side of the pin in the cavity of the forming mold.

Namely, at the time of molding the wax molded article, the molten wax can be supplied from the central portion in the inside of the wax molded article that is being molded. As a result of this, the trace of the wax ejection outlet (gate trace) such as burrs does not remain on the outer circumferential surface of the wax molded article that has been molded, thereby eliminating the need for removing the gate trace. For this reason, the outer circumferential surface of the wax molded article is formed into a highly smooth surface without having a rough non-smooth surface part that will be caused by removal of the gate trace, and the volume of the wax molded article does not suffer from variation caused by removal of the gate trace.

In other words, the wax molded article of the core for molding will have an outer circumferential surface having a set size and a set high smoothness, so that by using a core for molding having such a wax molded article, one can mold a hollow ceramic molded article in which the inner and outer shapes of the body part are highly controlled.

Further, the second core for molding of the cores for molding according to the present invention is directed to a core for molding that is used for simultaneously molding a plurality of hollow ceramic molded articles integrally having a hollow body part and a narrow pipe part.

The core for molding includes a plurality of wax molded articles having an outer shape corresponding to the inner shape of the body part and a long pin having an outer shape corresponding to the inner shape of the narrow pipe part and serially piercing though the wax molded articles for joining. The pin is a pipe-shaped hollow pin and includes an ejection outlet of wax at a portion corresponding to the joining portions of the wax molded articles.

It goes without saying that the core for molding produces the same functions and effects as the first core for molding that includes a hollow pin having an ejection outlet of the wax. In addition, by using one core for molding, a plurality of hollow ceramic molded articles corresponding to the number of wax molded articles can be simultaneously molded.

In the first core for molding and the second core for molding according to the present invention, various modes can be adopted in producing a hollow ceramic molded article.

For example, regarding the pin constituting each of the cores for molding according to the present invention, it is preferable that the surface roughness (Ra) of the pin is set to be 0.1 to 3.2, that the adhesion strength of the pin to the wax molded article is set to be 0.1 kg to 2 kg, and that the gap formed in the wax molded article by drawing out the pin is set to be at least 1 vol % of the volume occupied by the wax molded article in view of the later-described production of the hollow ceramic molded article and in view of the characteristics of the hollow ceramic molded article to be produced.

Due to similar reasons, regarding the wax molded article constituting each of the cores for molding according to the present invention, it is preferable that the melting point of the wax is set to be within the range from 30° C. to 80° C., that the viscosity of the wax at melting is set to be 10 ps or less, and that the volume change ratio of the wax by molten-solid phase transition is set to be 5% or less.

Here, in each of the cores for molding according to the present invention, due to reasons in the production of the cores themselves, various modes mentioned above can be adopted, and with regard to this point, each produces its own functions and effects, as shown in detail in the section of later-described "Detailed Description of the Invention".

The method of producing a core for molding according to the fifth aspect of the present invention is a method of producing a core for molding that constitutes a forming mold for producing the above-described hollow ceramic molded article, and the first production method thereof is a method of producing a core for molding in which a pin without having an ejection outlet of wax is a constituent member. In the first production method, a forming mold having a cavity corresponding to the outer shape of the wax molded article and a space part being in communication with the cavity for housing the pin is adopted, and the wax in a molten state is supplied to the cavity through a wax injection passageway disposed in the forming mold in a state in which the pin is housed in the forming mold. This facilitates production of the core for molding.

Further, the second production method for producing a core for molding according to the present invention is a method of producing a core for molding in which a pin being open on at least one end and having an ejection outlet of the wax at a portion corresponding to the joining portion of the wax molded article is a constituent member. In the second production method, a forming mold having a cavity corresponding to the outer shape of the wax molded article and a space part being in communication with the cavity for housing the pin is adopted, and the wax in a molten state is injected through an inner hole of the pin and supplied to the cavity from the ejection outlet disposed in the pin in a state in which the pin is housed in the forming mold.

If this production method is adopted, the molten wax can be supplied from the central portion in the inside of the wax molded article that is being molded, whereby one can produce a core for molding made of a wax molded article in which the trace of the wax ejection outlet (gate trace) such as burrs does not remain on the outer circumferential surface.

The method of producing a core for molding according to the sixth aspect of the present invention is a method of producing the above-described core for molding that is used for simultaneously molding a plurality of hollow ceramic molded articles integrally having a hollow body part and a narrow pipe part. The method of producing the core for molding is a method of producing a core for molding including a plurality of wax molded articles and a long pin serially piercing through the wax molded articles for joining, wherein the pin is a pipe-shaped hollow pin and has ejection outlets of wax at portions corresponding to the joining portions of the wax molded articles.

In the production method, a forming mold serially having a plurality of cavities corresponding to the outer shape of the wax molded articles and a space part being in communication with the cavities for housing the long pin is adopted, and the wax in a molten state is injected through an inner hole of the pin and supplied to the cavities from the ejection outlets disposed in the pin in a state in which the pin is housed in the forming mold. This production method facilitates production of a core for molding having the same characteristics as the core for molding produced by the second production method and being capable of simultaneously producing a plurality of hollow ceramic molded articles.

The seventh aspect of the present invention relates to a hollow ceramic molded article, and is a hollow ceramic molded article produced by each of the production methods according to the present invention. The hollow ceramic molded article is a hollow ceramic molded article integrally having a hollow body part and a narrow pipe part and being molded with the use of a core for molding, wherein the body part has a smooth circumferential surface shape controlled by the wax molded article that the core for molding has, and the narrow pipe part has a smooth circumferential surface shape controlled by the pin that the core for molding has.

The eighth aspect of the present invention relates to a discharge vessel, and is a hollow ceramic component of light-transmitting ceramic quality formed from a precursor made of the hollow ceramic molded article according to the present invention and made by baking the hollow ceramic molded article. In the discharge vessel, the body part having a smooth inner circumferential surface controlled by the wax molded article of the core for molding is constructed to be an electric discharging space part, and the narrow pipe part having a smooth inner circumferential surface controlled by the pin of the core for molding is constructed to be an insertion space for inserting an electrode member. The discharge vessel has excellent luminous characteristics, since the shapes of the inner and outer circumferences of the electric discharging space part constituting the body part are accurately controlled by the wax molded article of the core for molding.

DETAILED DESCRIPTION OF THE INVENTION

Part 1

Figure 1:
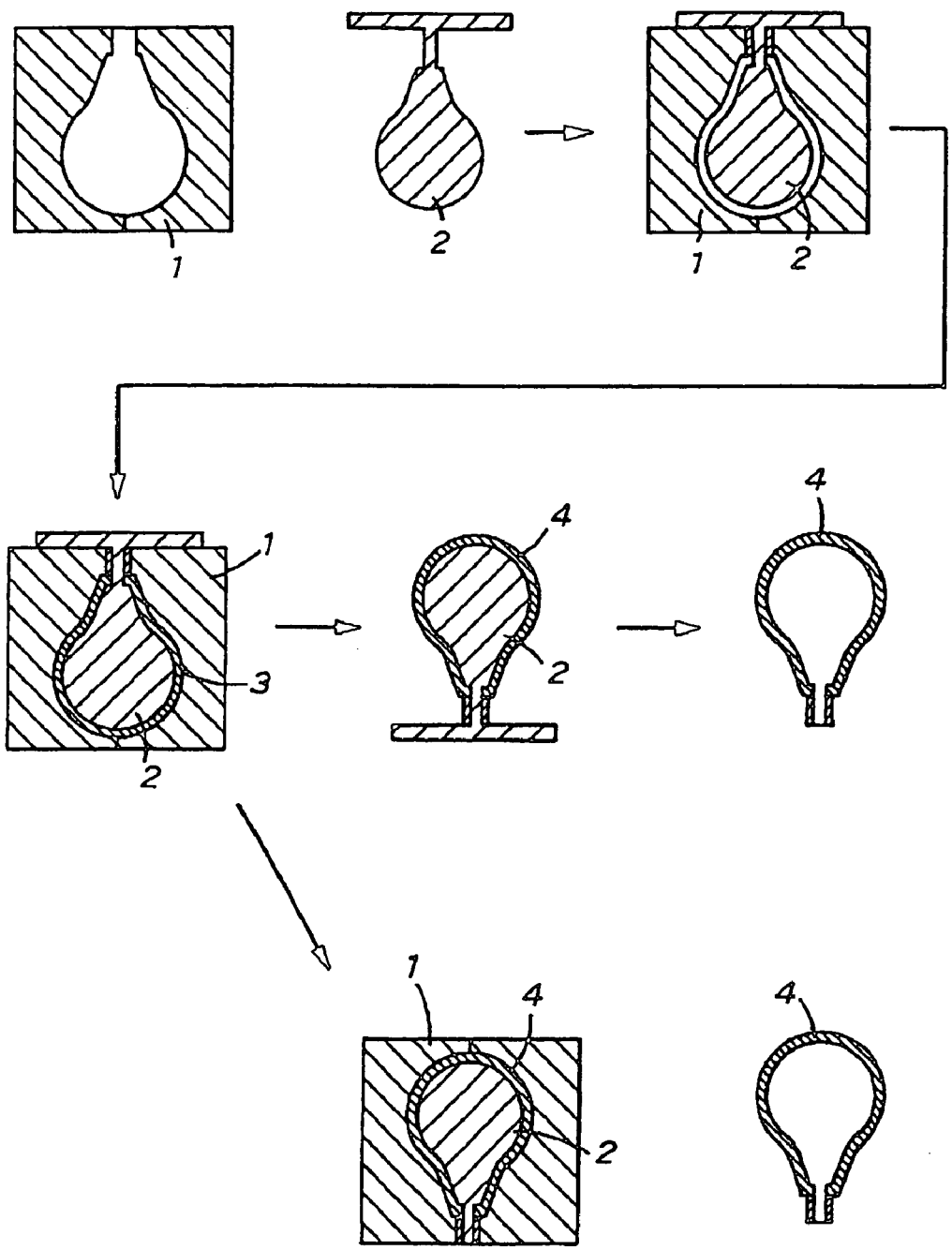
FIG. 1 is a model view of steps illustrating one embodiment in the present invention.

The present invention relates to a method of producing a molded article, a slurry for molding, a core for molding, a method of producing a core for molding, a hollow ceramic molded article, and a discharge vessel. One example of the embodiments according to the present invention is a method of producing a molded article by the gel-cast method in which a slurry made of a ceramic powder, a metal powder, or a mixture powder of these two powders as a source material powder is adopted as a molding source material (slurry for molding). Further, another example of the embodiments according to the present invention is a method of producing a hollow ceramic molded article made by the gel-cast method that adopts a slurry for molding. In these embodiments, a slurry having a special composition is adopted as the slurry for molding, and a mold and a core for molding having a special structure are adopted as the forming mold and the core for molding.

In one example of the embodiments according to the present invention, a slurry containing a ceramic powder, a metal powder, or a mixture powder of these two powders together with a dispersion medium and a gellifying agent is adopted as the molding material of the molded article; the slurry is gellified and cured in a forming mold to form a molded article; and at least a part of the forming mold is degraded or dissolved in releasing the molded article.

In the production method, in consideration of the complexity, fineness, and the like of the shape or structure of the molded article constituting an object of production, one can adopt a forming mold made of a core for molding at least a part of which is formed with a degradable material or a soluble material and a split-type outer mold formed with a non-degradable and non-soluble material as the forming mold, or else one can adopt a forming mold made of a core for molding at least a part of which is formed with a degradable material or a soluble material and an outer mold at least a part of which is formed with a degradable material and a soluble material as the forming mold.

Slurry for Molding

The slurry for molding (which may hereafter be simply referred to as slurry) contains a source material powder, a dispersion medium, and a gellifying agent as constituent components. The source material powder is a ceramic powder, a metal powder, or a mixture powder of these two powders. Specifically, one can mention a ceramic powder such as glass, alumina, silicon nitride, silicon carbide, aluminum nitride, zirconia, SIALON as well as various metal powders, and these powders can be used alone or by suitably mixing two or more kinds of the powders. Here, the particle size of these source material powders is not particularly limited as long as a slurry can be prepared, and those having a preferable particle size are suitably selected in accordance with the molded article to be produced.

The dispersion medium and the gellifying agent contain organic compounds having a reactive functional group, and these organic compounds can react with each other. This allows that the curing efficiency is high in the slurry, and a desired curing property is obtained by addition of a small amount of the gellifying agent owing to the high curing efficiency. Further, owing to the addition of a small amount of the gellifying agent, the slurry can be maintained to have a low viscosity and a high fluidity. Here, the aforementioned reactive functional group means a group of atoms capable of undergoing a chemical reaction with other components and, as a reactive functional group, one can mention hydroxy group, carbonyl group, carboxyl group, amino group, carbonyl group and methoxy group formed by later-described ester bonds, and others.

Among the organic compounds having a reactive functional group, the organic compound that the dispersion medium contains is preferably an ester or the like which is a low-viscosity liquid substance having a viscosity at 20° C. of 20 cps or less. Particularly, an ester whose total carbon number is 20 or less is preferable. Further, the ester bond preferably has a $CH_3$—O—CO— group. Here, though esters are comparatively stable, reactivity of the slurry as a whole can be enhanced by use of a gellifying agent having a high reactivity.

The organic compound constituting the dispersion medium may be one having one reactive functional group; however, in order to allow a higher gellifying capability to be exhibited so as to sufficiently cure the slurry, an organic compound having two or more reactive functional groups is preferable. As an organic compound having two or more reactive functional groups, one can mention polyhydric alcohols such as diols such as ethylene glycol and trials such as glycerin, polybasic acids such as dicarboxylic acids, esters such as polybasic acid esters such as dimethyl glutarate and dimethyl malonate, and esters of polyhydric alcohol, such as triacetin.

Regarding the organic compound constituting the dispersion medium, in order to achieve a high reaction ratio for sufficiently curing the slurry and to impart a high fluidity to the slurry before curing so as to form an intricate molded article having a high-density, esters having two or more ester bonds, such as polybasic acid esters such as dimethyl glutarate and acid esters of polyhydric alcohol such as triacetylene, are preferable.

Regarding the organic compound constituting the dispersion medium, reactive functional groups in the molecule need not necessarily be functional groups of the same kind but may be different functional groups. However, due to the aforementioned reasons, the organic compound preferably contains at least one ester bond. Further, the dispersion medium need not necessarily be constructed only with organic compounds having a reactive functional group but may contain nonreactive components.

As allowable nonreactive components, one can mention, for example, ether, hydrocarbon, toluene, and others. These nonreactive components may be selected in accordance with the chemical properties such as compatibility of the organic compound having a reactive functional group and constituting the dispersion medium and a later-described dispersing agent. For example, if an ester is used as the organic compound constituting the dispersion medium and having a reactive functional group, the dispersion medium preferably contains an ether in view of compatibility and others.

Here, as a nonreactive component, one can make use of water which is widely used as a dispersion medium. However, if water is to be used as the dispersion medium, the amount of use thereof is preferably as small as possible, because it is difficult to dry the molded article and, if isocyanate is to be used as the later-mentioned gellifying agent, carbonic acid gas is generated by reaction with the gellifying agent whereby air bubbles are mixed into the molded article to decrease the density or strength of the molded article or a baked article thereof, and cracks are liable to be generated in the molded article or the baked article, and for other reasons.

Even if an organic compound is to be adopted as the nonreactive component, the dispersion medium preferably contains an organic compound having a reactive functional group at 60 mass % or more in the total dispersion medium in order to ensure a sufficient efficiency of reaction with the gellifying agent. More preferably, the content is 85 mass % or more.

The gellifying agent constituting the slurry for molding contains an organic compound having a reactive functional group that reacts with the organic compound having a reactive functional group and constituting the dispersion medium to cure the slurry. The organic compound constituting the gellifying agent may be one having, in the molecule, a reactive functional group that undergoes chemical reaction with the organic compound in the dispersion medium. As such an organic compound, one can mention monomers, oligomers, prepolymers that are three-dimensionally cross-linked through the intermediary of a cross-linking agent, and others, for example, polyvinyl alcohol, epoxy resin, phenolic resin, and others.

However, in order to ensure the fluidity of the slurry, the organic compound constituting the gellifying agent is preferably one having a low viscosity, specifically a liquid substance having a viscosity at 20° C. of 30 ps or less. As such an organic compound having a low viscosity, one having a smaller molecular weight than the polymer or prepolymer, specifically a monomer or oligomer having an average molecular weight (by the GPC method) of 2000 MW or less, is preferable. Here, the viscosity as referred to herein means the viscosity of the organic compound itself having a reactive functional group and constituting the gellifying agent, and does not mean the viscosity in a state in which the organic compound is diluted with a diluting liquid, such as in an aqueous solution.

The gellifying agent may be one obtained by dispersing or dissolving such an organic compound having a reactive functional group with a diluting liquid; however, as described above, if the organic compound itself that contributes to the reaction has a low viscosity, dilution with a diluting liquid is unnecessary, since the reaction efficiency can be enhanced. Alternatively, if a diluting liquid is to be used, the amount of use thereof is preferably restrained to the minimum amount that is needed in obtaining a desired viscosity.

Regarding the organic compound constituting the gellifying agent, it is preferable to select one having a suitable reactive functional group in consideration of the reactivity with the organic compound in the dispersion medium. For example, if an ester having a comparatively low reactivity is to be used as the organic compound constituting the dispersion medium, it is preferable to select an organic compound having a highly reactive isocyanate group (—N=C=O) and/or isothiocyanate group (—N=C=S) as the organic compound having a reactive functional group and constituting the gellifying agent. However, though isocyanates are generally allowed to react with diols or diamines, one should be careful since many diols have a high viscosity and diamines have a high reactivity and in some cases may be cured before the slurry is injected into the forming mold. As an organic compound having an isocyanate group (—N=C=O) and/or isothiocyanate group (—N=C=S), one can mention chemical substances based on the chemical structures represented by the following general formula (1) to general formula (5).

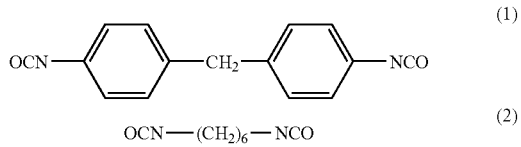

-continued

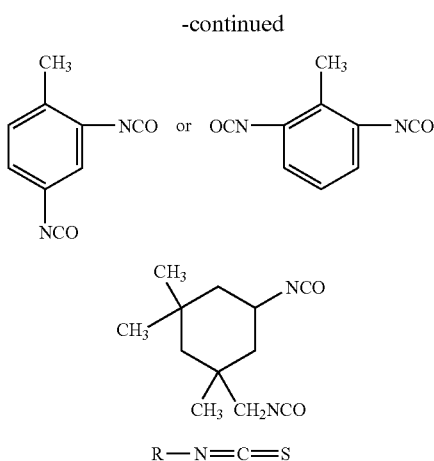

The chemical substances based on the chemical structure represented by the general formula (1) are 4,4'-diphenylmethane diisocyanate series isocyanates (resins) . . . MDI series isocyanates; the chemical substances based on the chemical structure represented by the general formula (2) are hexamethylene diisocyanate series isocyanates (resins) . . . HDI series isocyanates; the chemical substances based on the chemical structure represented by the general formula (3) are tolylene diisocyanate series isocyanates (resins) . . . TDI series isocyanates; the chemical substances based on the chemical structure represented by the general formula (4) are isophorone diisocyanate series isocyanates (resins) . . . IPDI series isocyanates; and the chemical substances based on the chemical structure represented by the general formula (5) are isothiocyanates (resins).

Further, as the HDI series isocyanates (resins) based on the chemical structure represented by the general formula (2), one can mention dimers or trimers based on the chemical structures represented by the general formula (6) to general formula (8).

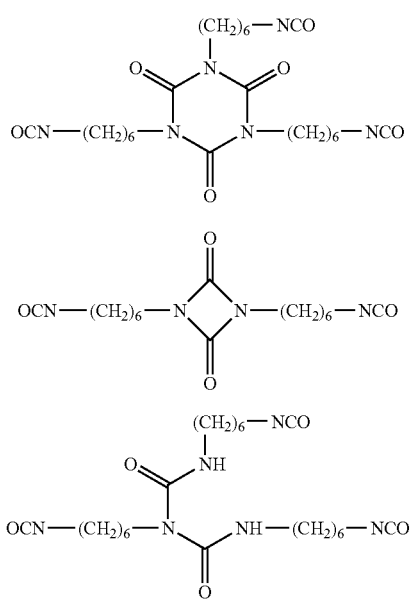

Among these, the organic compound constituting the gellifying agent is preferably an MDI series isocyanate (resin) or an HDI series isocyanate (resin), more preferably an MDI series isocyanate (resin). If these isocyanates (resins) are to be used as the gellifying agent, the hardness of the formed molded article will be improved and, even if the molded article has a thin structure, generation of cracks can be restrained. Further, since the shrinkage of the formed molded article at the time of drying is reduced, generation of cracks and deformation can be restrained at the time of drying the molded article. Further, the curing speed of the slurry at the time of forming the molded article will be improved, thereby increasing the speed of the molding step.

Regarding the gellifying agent, other functional groups can be introduced into each of the aforementioned basic chemical structures in view of the chemical properties such as compatibility with the dispersion medium. For example, if a dispersion medium containing an ester as a major component is an object, it is preferable to introduce a hydrophilic functional group into the basic chemical structure in order to enhance the compatibility with the ester to enhance the uniformity at the time of mixing. Further, reactive functional groups other than isocyanate group or isothiocyanate group can be contained in the molecule of the organic compound constituting the gellifying agent. In this case, isocyanate group or isothiocyanate group may be mingled, or numerous isocyanate groups or isothiocyanate groups may be present like polyisocyanate group.

It is preferable that the slurry for molding is not cured at the time of injection into the forming mold, but is cured speedily in the forming mold after the injection. For this reason, in preparing the slurry, it is preferable to take the temperature of the slurry before injection, the type and the content of the reactive dispersion medium, the type and the content of the reactive gellifying agent, the presence or absence of a catalyst that contributes to the gellifying reaction, the type and the content of the catalyst, and others into consideration. In preparing the slurry, the gellifying agent may be added and dispersed after the source material powder is added and dispersed into the dispersion medium, or alternatively the source material powder and the gellifying agent may be simultaneously added and dispersed into the dispersion medium.

In view of the workability at the time of injecting the slurry for molding into the forming mold, the viscosity of the slurry at 20° C. is preferably 300 ps or less and, more preferably, the viscosity at 20° C. is 200 ps or less. Here, in the case of injecting the slurry in a non-pressurized state into a mold having a fine shape in order to form a hollow ceramic molded article according to the present invention or other cases, the viscosity of the slurry at 25° C. is preferably 5 ps or less.

However, if the slurry concentration (vol % of the source material powder relative to the total volume of the slurry) is too low, the density of the formed molded article decreases to decrease the strength of the molded article, and also cracks and deformation are liable to be generated at the time of drying or baking the molded article, so that the slurry concentration is 25 vol % to 75 vol %, preferably 35 vol % to 75 vol %. Here, the viscosity of the slurry is adjusted by the slurry concentration, the viscosities of the reactive dispersing agent and the gellifying agent, the type of the source material powder, the amount of other additives that are optionally added in accordance with the needs, and the like.

In the slurry for molding, effective additives can be added as long as they do not deteriorate the functions and effects intended by the present invention. As the additives, one can mention, for example, a dispersing agent, an anti-foaming agent, a surface active agent for facilitating the preparation of the slurry, a sintering aid, a property improving agent for improving the characteristics of the sintered component of the molded article, and others.

The dispersing agent acts on the source material powder in the dispersion medium to aid the dispersion, and one can mention polycarboxylic acid esters and others. The content of the dispersing agent relative to the source material powder is preferably from 0.1 wt % to 5 wt %. Further, if a molded article constituting a precursor of a discharge vessel is to be produced, it is preferable to add at least one kind selected from Mg, Y, Zr, Sc, La, Si, B, Na, Cu, Fe, Ca, and oxides of these metals in view of improvement in the light transmittance; however, the amount of addition thereof is preferably from 0.02 wt % to 0.15 wt % relative to the source material powder.

The slurry for molding is cured in a state of being injected into the forming mold by the gellifying reaction between the organic compounds having a reactive functional group that the dispersion medium and the gellifying agent contain. Therefore, in the production of a molded article, the gel-cast method using the slurry for molding as a molding source material is adopted. In the gel-cast method, one can adopt means for injecting a slurry for molding into a forming mold, means for leaving the injected slurry to stand in the forming mold for a predetermined period of time, means for adding a catalyst to the slurry immediately before the injection into the forming mold, and other means.

Forming Mold

In the method of producing a molded article according to the present invention, a forming mold is adopted in which at least a part of the forming mold is formed with a degradable material or a soluble material, and the molded article formed by gellifying and curing the slurry in the forming mold is released by degrading or dissolving at least a part of the forming mold.

The forming mold may be one constructed with one piece of a mold material, or may be constructed with two or more pieces of mold members such as an outer mold and a core for molding, or the like. Further, the forming mold may be one the whole of which is formed with a degradable material or a soluble material, or may be one only a part of which is formed with a degradable material or a soluble material. Further, a forming mold made of two or more mold materials may be such that one piece of the mold materials thereof is formed with a degradable material or a soluble material and the other mold materials are constructed with a non-degradable and non-soluble material. For example, there is a mode in which the core for molding is formed with a degradable material or a soluble material and the outer mold is formed with a non-degradable and non-soluble material.

FIG. 1 is a model view illustrating one example of a process for producing a molded article based on the gel-cast method in which the forming mold is adopted. In the gel-cast method, a forming mold made of a split-type outer mold 1 formed with a non-degradable and non-soluble material and a core 2 for molding formed with a degradable material or a soluble material is adopted as the forming mold. In the forming mold, a slurry 3 is injected into a space part formed by the outer mold 1 and the core 2 for molding, and the injected slurry 3 is gellified and cured to form a molded article 4. The formed molded article 4 in the forming mold is released from the outer mold 1 by splitting the outer mold 1, and is released from the core 2 for molding by degrading or dissolving the core 2 for molding in the molded article 4.

Figure 2:
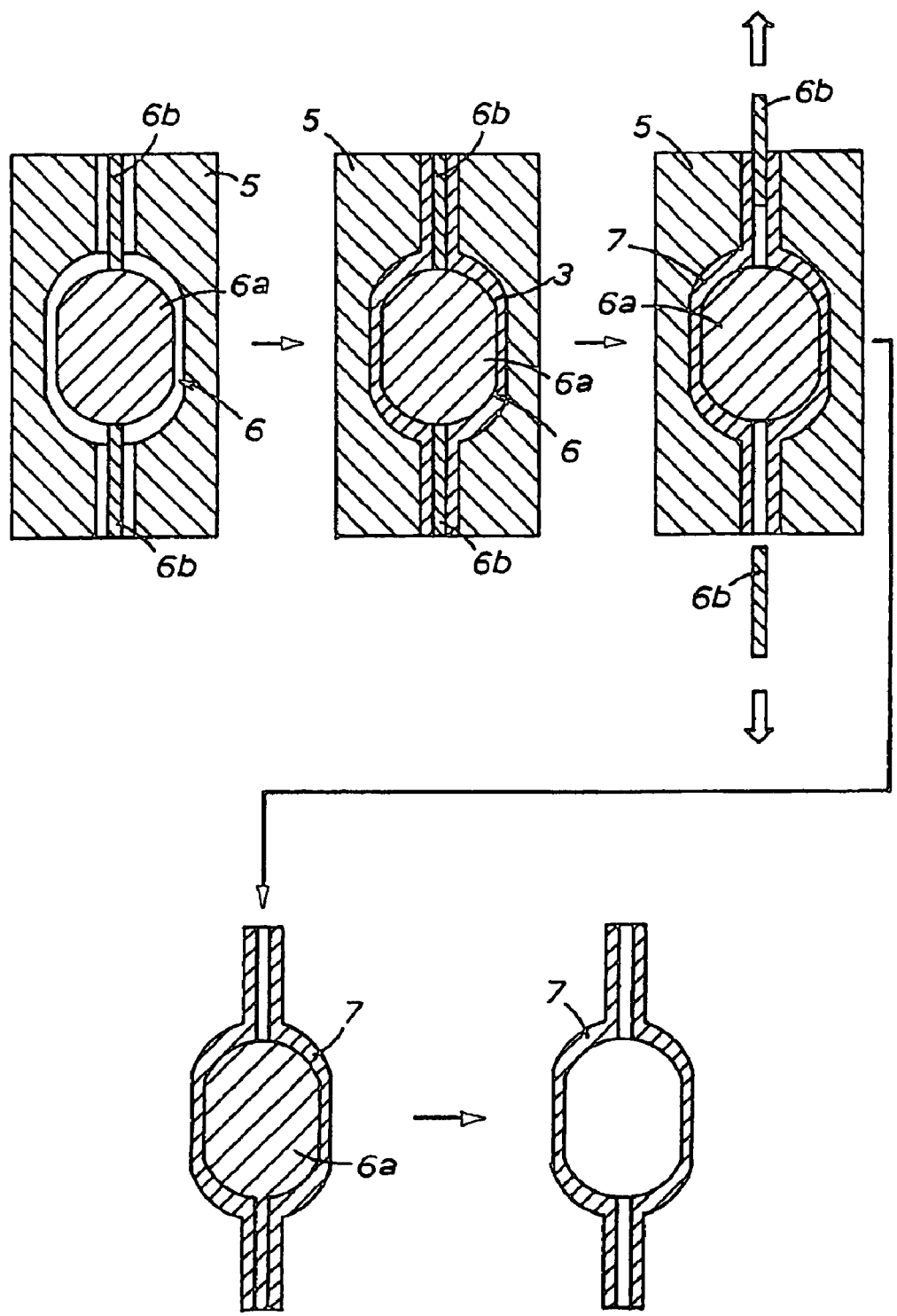
FIG. 2 is a model view of steps illustrating another embodiment in the present invention.

FIG. 2 is a model view illustrating another example of a process for producing a molded article based on the gel-cast method in which the forming mold is adopted. In the gel-cast method, a forming mold made of a split-type outer mold 5 formed with a non-degradable and non-soluble material and a core 6 for molding a part of which is formed with a degradable material or a soluble material is adopted as the forming mold. The core 6 for molding is constructed with a first member 6a made of a degradable material or a soluble material and a second member 6b made of a non-degradable and non-soluble material.

In the forming mold, a slurry 3 is injected into a space part formed by the outer mold 5 and the core 6, and the injected slurry 3 is gellified and cured to form a molded article 7. The formed molded article 7 in the forming mold is released from the outer mold 5 by splitting the outer mold 5, and is released from the core 6 for molding by separating the second member 6b constituting the core 6 for molding in the molded article 7 and degrading or dissolving the first member 6a for removal.

Figure 3:
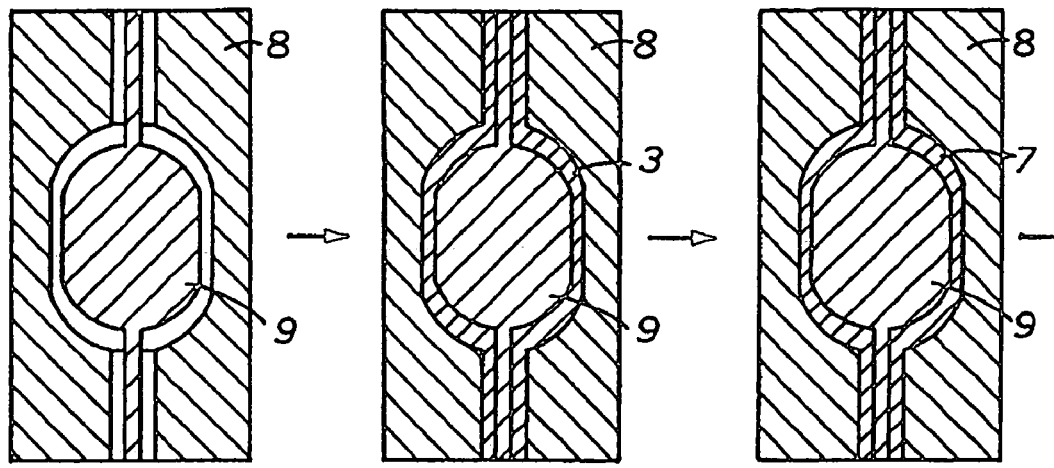
FIG. 3 is a model view of steps illustrating still another embodiment in the present invention.
Figure 3:
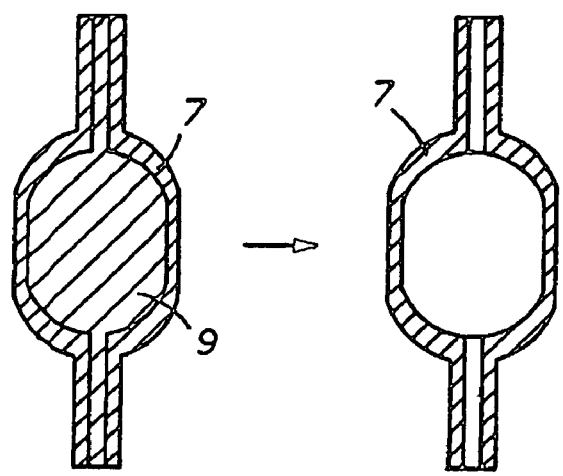

FIG. 3 is a model view illustrating still another example of a process for producing a molded article based on the gel-cast method in which the forming mold is adopted. In the gel-cast method, a forming mold made of a non-split-type outer mold 8 the whole of which is formed with a degradable material or a soluble material and a core 9 for molding the whole of which is formed with a degradable material or a soluble material is adopted as the forming mold. In the forming mold, a slurry 3 is injected into a space part formed by the outer mold 8 and the core 9 for molding, and the injected slurry 3 is gellified and cured to form a molded article 7. The formed molded article 7 in the forming mold is released from the outer mold 8 and the core 9 for molding by degrading or dissolving the outer mold 8 and the core 9 for molding.

If a forming mold constructed with two or more mold materials such as one made of an outer mold and a core for molding is to be adopted, the order of which mold material is to be released first is arbitrary, and the mold materials are released in the order of easiness of the releasing work. For example, in the production process shown in FIG. 1, the core 2 for molding can be released by degrading or dissolving after separating the outer mold 1, or alternatively the outer mold 1 can be released by separating after degrading or dissolving the core 2 for molding.

As a degradable material constituting the forming mold, those having a smaller strength than the molded article to be produced are preferable, and one can mention, for example, paper, sand, plaster, and others. Further, as a soluble material, one can mention a material that is dissolved by reaction with water or an organic solvent, such as foamed styrol, or a wax that is solid at room temperature and melted when heated to a predetermined temperature, or the like. Among these degradable materials and soluble materials, wax is more preferable in view of easy releasing. Here, the non-degradable and non-soluble material constituting the forming mold is not limited by any means, and one can mention, for example, metals, ceramics, rubbers, and others.

Figure 4:
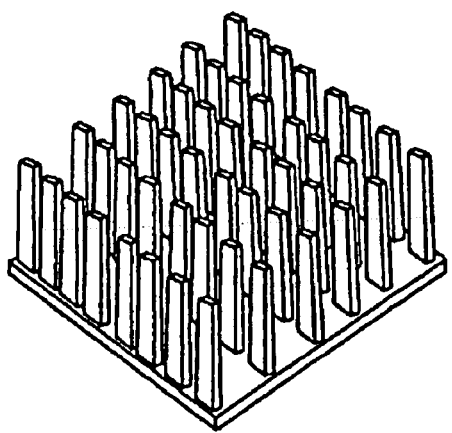
FIG. 4 is a perspective model view illustrating one example of a prototype mold to be used for preparation of a forming mold of the present invention.
Figure 5:
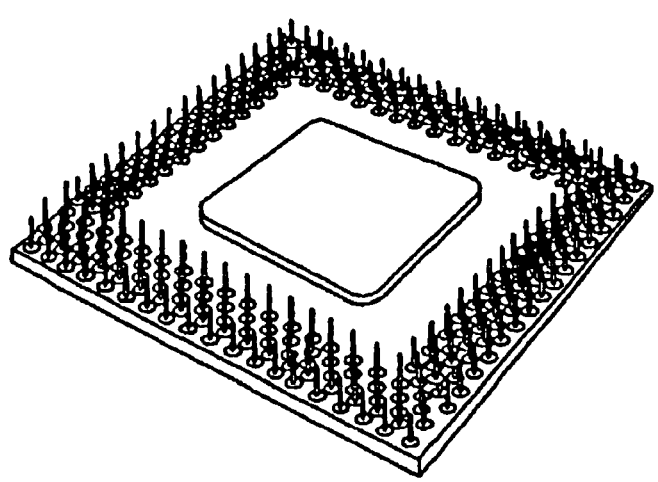
FIG. 5 is a perspective model view illustrating another example of a prototype mold to be used for preparation of a forming mold of the present invention.
Figure 6:
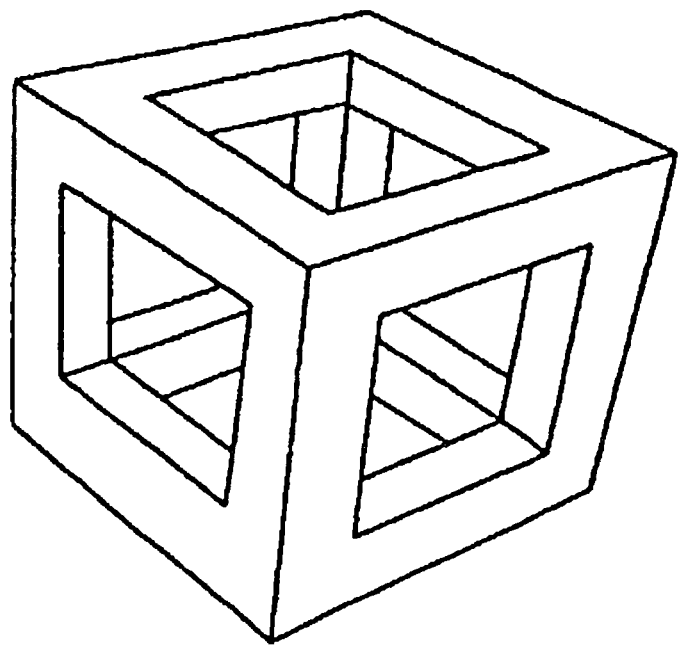
FIG. 6 is a perspective model view illustrating still another example of a prototype mold to be used for preparation of a forming mold of the present invention.

Here, in FIG. 1 to FIG. 3, the outer mold and the core for molding constituting the forming mold are shown with the same cross-sectional representations indicated by simple hatches. The reason is that, in these examples, cross-sectional representations showing materials cannot be made, since the materials of the outer mold and the core for molding cannot be specified. Further, FIG. 4 to FIG. 6 show a plurality of examples of the prototype molds to be used in fabricating a forming mold.

EXAMPLES

Preparation of Slurry:

Slurry A1: AES-11C (manufactured by Sumitomo Chemicals, Co., Ltd., trade name) which is an alumina powder as the source material powder, a dispersion medium made of dimethyl malonate as the dispersion medium, MALIALIM AKM-0531 (manufactured by Nippon Yushi Co., Ltd., trade name) as the dispersing agent, Bayhydur 3100 (manufactured by Sumitomo Bayer Urethane Co., Ltd., trade name) which is an isocyanate resin as the gellifying agent, and triethylamine as the reaction catalyst were respectively adopted.

Preparation of a slurry was carried out at room temperature (around 20° C.) and, after 1 part by weight of the dispersing agent was added and mixed into 24 parts by weight of the dispersion medium, 100 parts by weight of the alumina powder were added and dispersed and thereafter 2 parts by weight of the gellifying agent was added and dispersed, followed by addition of 0.2 part by weight of the reaction catalyst to prepare the slurry. The slurry will be referred to as slurry A1. Specifically, in slurry A1, 240.0 g of the dispersion medium, 10.0 g of the dispersing agent, 1000.0 g of the alumina powder, 20.0 g of the gellifying agent, and 2.0 g of the reaction catalyst are adopted. Slurry A1 has a slurry concentration of 67.8 vol % and a slurry viscosity of 90 ps.

Slurry A2: A slurry was prepared under the same condition as slurry A1 except that glass powder was adopted as the source material powder, that the amount of use of the dispersion medium was changed to 150.0 g, that the amount of addition of the gellifying agent was changed to 12.0 g, that the amount of addition of the reaction catalyst was changed to 1.5 g, and that the amount of addition of the dispersing agent was changed to 11.3 g. The slurry will be referred to as slurry A2. Slurry A2 has a slurry concentration of 67.8 vol % and a slurry viscosity of 90 ps.

Slurry A3: A slurry was prepared under the same condition as slurry A1 except that powder of silicon nitride was adopted as the source material powder, that the amount of use of the dispersion medium was changed to 350.0 g, that the amount of addition of the gellifying agent was changed to 28.0 g, that the amount of addition of the reaction catalyst was changed to 3.5 g, and that the amount of addition of the dispersing agent was changed to 26.3 g. The slurry will be referred to as slurry A3. Slurry A3 has a slurry concentration of 42.5 vol % and a slurry viscosity of 35 ps.

Slurry A4: A slurry was prepared under the same condition as slurry A1 except that powder of zirconia was adopted as the source material powder, that the amount of use of the dispersion medium was changed to 365.0 g, that the amount of addition of the gellifying agent was changed to 29.2 g, that the amount of addition of the reaction catalyst was changed to 3.7 g, and that the amount of addition of the dispersing agent was changed to 27.4 g. The slurry will be referred to as slurry A4. Slurry A4 has a slurry concentration of 28.7 vol % and a slurry viscosity of 7.5 ps.

Slurry A5: A slurry was prepared under the same condition as slurry A1 except that powder of aluminum nitride was adopted as the source material powder, that the amount of use of the dispersion medium was changed to 445.0 g, that the amount of addition of the gellifying agent was changed to 35.6 g, that the amount of addition of the reaction catalyst was changed to 4.5 g, and that the amount of addition of the dispersing agent was changed to 33.4 g. The slurry will be referred to as slurry A5. Slurry A5 has a slurry concentration of 38.2 vol % and a slurry viscosity of 5.8 ps.

Slurry A6: A slurry was prepared under the same condition as slurry A1 except that ethylene glycol was adopted as the dispersion medium, that the amount of addition of the gellifying agent was changed to 19.2 g, that the amount of addition of the reaction catalyst was changed to 2.4 g, and that the amount of addition of the dispersing agent was changed to 18.0 g. The slurry will be referred to as slurry A6. Slurry A6 has a slurry concentration of 47.8 vol % and a slurry viscosity of 200 ps.

Slurry A7: A slurry was prepared under the same condition as slurry A1 except that the amount of addition of the gellifying agent was changed to 19.2 g, that the reaction catalyst was not adopted, and that the amount of addition of the dispersing agent was changed to 18.0 g. The slurry will be referred to as slurry A7. Slurry A7 has a slurry concentration of 47.8 vol % and a slurry viscosity of 7 ps.

Slurry A8: A slurry was prepared under the same condition as slurry A1 except that powder of zirconia was adopted as the source material powder, that a mixture of dimethyl malonate and dimethyl ether (80:20) was adopted as the dispersion medium and the amount of use thereof was set to be 365.0 g, that the amount of addition of the gellifying agent was changed to 29.2 g, that the amount of addition of the reaction catalyst was changed to 3.7 g, and that the amount of addition of the dispersing agent was changed to 27.4 g. The slurry will be referred to as slurry A8. Slurry A8 has a slurry concentration of 42.5 vol % and a slurry viscosity of 7 ps.

Slurry A9: A slurry was prepared under the same condition as slurry A1 except that powder of zirconia was adopted as the source material powder, that a mixture of dimethyl malonate and dimethyl ether (50:50) was adopted as the dispersion medium and the amount of use thereof was set to be 365.0 g, that the amount of addition of the gellifying agent was changed to 29.2 g, that the amount of addition of the reaction catalyst was changed to 3.7 g, and that the amount of addition of the dispersing agent was changed to 27.4 g. The slurry will be referred to as slurry A9. Slurry A9 has a slurry concentration of 42.5 vol % and a slurry viscosity of 6 ps.

Preparation of Forming Mold:

Forming mold B1: The forming mold is formed by using a mold shown in FIG. 4 and having a shape of a heat sink in the CPU of a computer as a prototype mold. A paraffin wax (manufactured by Nippon Seirou Co., Ltd.) having a melting point of 60° C., which is a source material for forming the forming mold, was cast in a molten state into the prototype mold and, after the paraffin wax was cured, the paraffin wax was separated from the prototype mold, thereby preparing a forming mold having a shape of a reversed mold relative to the prototype mold. The forming mold will be referred to as forming mold B1.

Forming mold B2: The forming mold is formed by using a mold shown in FIG. 4 and having a shape of a heat sink in the CPU of a computer as a prototype mold. A wax A (manufactured by Nippon Freeman Co., Ltd., trade name) having a melting point of 70° C., which is a source material for forming the forming mold, was cast in a molten state into the prototype mold and, after the wax A was cured, the wax A was separated from the prototype mold, thereby preparing a forming mold having a shape of a reversed mold relative to the prototype mold. The forming mold will be referred to as forming mold B2.

Forming mold B3: The forming mold is based on a mold shown in FIG. 4 and having a shape of a heat sink in the CPU of a computer as a prototype mold. RHEODOL AS-10

(manufactured by Kao Co., Ltd., trade name) made of sorbitan monostearate having a melting point of 55° C., which is a source material for forming the forming mold, was cast in a molten state into the prototype mold and, after RHEODOL AS-10 was cured, RHEODOL AS-10 was separated from the prototype mold, thereby preparing a forming mold having a shape of a reversed mold relative to the prototype mold. The forming mold will be referred to as forming mold B3.

Forming mold B4: The forming mold is formed by using a mold shown in FIG. 4 and having a shape of a heat sink in the CPU of a computer as a prototype mold. Cetyl alcohol (manufactured by Katayama Chemicals Co., Ltd.) having a melting point of 55° C., which is a source material for forming the forming mold, was cast in a molten state into the prototype mold and, after cetyl alcohol was cured, cetyl alcohol was separated from the prototype mold, thereby preparing a forming mold having a shape of a reversed mold relative to the prototype mold. The forming mold will be referred to as forming mold B4.

Forming mold B5: The forming mold is formed by using the CPU of a computer shown in FIG. 5 as a prototype mold. The prototype mold was pressed onto RHEODOL AS-10 (manufactured by Kao Co., Ltd., trade name) made of sorbitan monostearate having a melting point of 55° C. which had been brought into a semi-molten state at a temperature around the melting point and, after RHEODOL AS-10 was cooled, the prototype mold was separated, thereby preparing a forming mold. The forming mold will be referred to as forming mold B5.

Forming mold B6: The forming mold is made of an outer mold and a core for molding shown in FIG. 1, and the outer mold is a bisectional split-type outer mold made of silicone rubber KE-12 (manufactured by Shinoetsu Chemicals Co., Ltd., trade name) having a reversed shape of a lamp shape obtained by using an incandescent lamp as a prototype mold. Further, the core for molding exhibits a shape which is a little smaller than the shape of the incandescent lamp used as the prototype mold, and is prepared by using a paraffin wax (manufactured by Nippon Seirou Co., Ltd.) having a melting point of 60° C. The forming mold made of these outer mold and core for molding will be referred to as forming mold B6.

Forming mold B7: The forming mold is made of an outer mold and a core for molding shown in FIG. 1, and the outer mold is a bisectional split-type outer mold made of silicone rubber having a reversed shape of a lamp shape obtained by using an incandescent lamp as a prototype mold. Further, the core for molding exhibits a shape which is a little smaller than the shape of the incandescent lamp used as the prototype mold, and is prepared by using foamed styrol. The forming mold made of these outer mold and core for molding will be referred to as forming mold B7.

Forming mold B8: The forming mold is formed by using a mold obtained by forming a mold of a frame shape shown in FIG. 6 with foamed styrol and having a protruding injection inlet as a prototype mold. The prototype mold is immersed, except for the tip end of the injection inlet thereof, into wax A kept in a molten state and, after wax A is cooled and cured, acetone is injected through the injection inlet of the prototype mold made of foamed styrol so as to dissolve the prototype mold, thereby preparing a forming mold. The forming mold will be referred to as forming mold B8.

Forming mold B9: The forming mold is formed by using a mold shown in FIG. 4 and having a shape of a heat sink in the CPU of a computer as a prototype mold. A silicone rubber KE-12, which is a source material for forming the forming mold, was cast in a molten state into the prototype mold and, after silicone rubber was cured, silicone rubber was separated from the prototype mold, thereby preparing a forming mold. The forming mold will be referred to as forming mold B9.

The compositions and characteristics of the above-described nine types of slurry A1 to slurry A9 are collectively shown in Table 1 and Table 2, and the shapes and materials of the above-described nine types of forming mold B1 to forming mold B9 are collectively shown in Table 3.

TABLE 1

Slurry for molding (Part 1)

| composition | slurries | | | | |
| --- | --- | --- | --- | --- | --- |
| | A1 | A2 | A3 | A4 | A5 |
| powder type | alumina | glass powder | silicon nitride | zirconia | aluminum nitride |
| Powder amount (g) | 1000.0 | 1000.0 | 1000.0 | 1000.0 | 1000.0 |
| Dispersion medium type | MDM | MDM | MDM | MDM | MDM |
| Dispersion Medium amount (g) | 240.0 | 150.0 | 350.0 | 365.0 | 445.0 |
| Gellifying agent type | ICN | ICN | ICN | ICN | ICN |
| Gellifying Agent amount (g) | 20.0 | 12.0 | 28.0 | 29.2 | 35.6 |
| Reaction Catalyst Type | TEA | TEA | TEA | TEA | TEA |
| Reaction Catalyst amount (g) | 2.0 | 1.5 | 3.5 | 3.7 | 4.5 |
| Dispersing agent type | AKM | AKM | AKM | AKM | AKM |
| Dispersing Agent amount (g) | 10.0 | 11.3 | 26.3 | 27.4 | 33.4 |

TABLE 1-continued

Slurry for molding (Part 1)

| composition | slurries | | | | |
|---|---|---|---|---|---|
| | A1 | A2 | A3 | A4 | A5 |
| Curing condition | 6 hr (room temperature) | 6 hr (room temperature) | 6 hr (room temperature) | 6 hr (room temperature) | 6 hr (room temperature) |
| Slurry Concentration | 67.8 | 67.8 | 42.5 | 28.7 | 38.2 |
| Slurry viscosity | 9000.0 | 9000.0 | 3500.0 | 750.0 | 580.0 |

(Notes)
MDM: dimethyl malonate,
ICN: isocyanate,
TEA: triethylamine,
AKM: abbreviation of dispersion medium,
slurry concentration: vol %,
slurry viscosity: cps

TABLE 2

Slurry for molding (Part 2)

| composition | Slurries | | | |
|---|---|---|---|---|
| | A6 | A7 | A8 | A9 |
| Powder Type | alumina | alumina | zirconia | zirconia |
| Powder amount (g) | 1000.0 | 1000.0 | 1000.0 | 1000.0 |
| Dispersion Medium Type | EG | MDM | MDM/DME (1) | MDM/DME (2) |
| Dispersion medium amount (g) | 240.0 | 240.0 | 365.0 | 365.0 |
| Gellifying Agent Type | ICN | ICN | ICN | ICN |
| Gellifying Agent amount (g) | 19.2 | 19.2 | 29.2 | 29.2 |
| Reaction Catalyst Type | TEA | — | TEA | TEA |
| Reaction Catalyst amount (g) | 2.0 | — | 3.7 | 3.7 |
| Dispersing Agent Type | AKM | AKM | AKM | AKM |
| Dispersing Agent amount (g) | 18.0 | 18.0 | 27.4 | 27.4 |
| Curing condition | 6 hr (room temperature) | 5 min (80° C.) | 6 hr (room temperature) | 6 hr (room temperature) |
| Slurry concentration | 47.8 | 47.8 | 42.5 | 42.5 |
| Slurry viscosity | 20000.0 | 700.0 | 700.0 | 600.0 |

(Notes)
MDM: dimethyl malonate,
ICN: isocyanate,
TEA: triethylamine,
AKM: abbreviation of dispersion medium,
EG: ethylene glycol
DME: dimethyl ether, (1): 80:20, (2): 50:50, slurry concentration: vol %,
slurry viscosity: cps

TABLE 3

Forming mold

| forming molds | shape | material |
|---|---|---|
| B1 | FIG. 4 | PW |
| B2 | FIG. 4 | WA |
| B3 | FIG. 4 | SM |
| B4 | FIG. 4 | PW |
| B5 | FIG. 5 | SM |
| B6 | FIG. 1 | outer mold: SR core: PW |
| B7 | FIG. 1 | outer mold: SR core: FS |
| B8 | FIG. 6 | WA |
| B9 | FIG. 4 | SR |

(Notes)
PW: paraffin wax,
WA: wax A,
SM: sorbitan monostearate
SR: silicone rubber,
FS: foamed styrol In this Example, a trial was made to produce molded articles using the above-described forming molds with the above-described slurries as molding source materials and to bake the produced molded articles. Evaluation was carried out on the cured states, released states, and states after drying of the molded articles, and the densities of the sintered articles.

Example 1

In Example 1, slurry A1 was adopted as a molding source material, and forming mold B1 was used. After slurry A1 was injected into forming mold B1, slurry A1 was left to stand at room temperature for six hours to gellify and cure slurry A1, thereby forming a molded article C1 in forming mold B1. Subsequently, forming mold B1 together with molded article C1 was put into a dryer and left to stand at 80° C. for a predetermined period of time to dissolve the forming mold B1 made of paraffin wax, thereby releasing the molded article C1. Thereafter, the released molded article C1 was degreased and baked at 1600° C. in ambient air atmosphere for four hours to obtain a sintered article C1'.

The obtained molded article C1 and sintered article C1' exhibited the shape of a heat sink in the CPU of a computer, and no generation of damages to molded article C1 was recognized at the releasing time. Further, no generation of cracks was recognized in molded article C1 or sintered article C1'. The results of evaluation on molded article C1 and sintered article C1' are shown in Table 4.

Example 2

In Example 2, slurry A1 was adopted as a molding source material, and forming mold B2 was used. Molded article C2 and sintered article C2' were produced under the same condition as in Example 1. No generation of damages to molded article C2 was recognized at the releasing time. Further, no generation of cracks was recognized in molded article C2 or sintered article C2'. The results of evaluation on molded article C2 and sintered article C2' are shown in Table 4.

Example 3

In Example 3, slurry A1 was adopted as a molding source material, and forming mold B3 was used. Molded article C3 and sintered article C3' were produced under the same condition as in Example 1. No generation of damages to molded article C3 was recognized at the releasing time. Further, no generation of cracks was recognized in molded article C3 or sintered article C3'. The results of evaluation on molded article C3 and sintered article C3' are shown in Table 4.

Example 4

In Example 4, slurry A1 was adopted as a molding source material, and forming mold B4 was used. Molded article C4 and sintered article C4' were produced under the same condition as in Example 1. No generation of damages to molded article C4 was recognized at the releasing time. Further, no generation of cracks was recognized in molded article C4 or sintered article C4'. The results of evaluation on molded article C4 and sintered article C4' are shown in Table 4.

Example 5

In Example 5, slurry A1 was adopted as a molding source material, and forming mold B1 was used. Molded article C5 was formed under the same condition as in Example 1. Molded article C5 and sintered article C5' were produced under the same condition as in Example 1 except that hot water of 80° C. was used in releasing. No generation of damages to molded article C5 was recognized at the releasing time. Further, no generation of cracks was recognized in molded article C5 or sintered article C5'. Here, since wax is separated and floats above the hot water at the time of releasing the molded article C5, molded article C5 could be easily taken out from within the hot water by cooling the hot water and removing the cured wax. The results of evaluation on molded article C5 and sintered article C5' are shown in Table 4.

Example 6

In Example 6, slurry A1 was adopted as a molding source material, and forming mold B5 was used. Molded article C6 and sintered article C6' were produced under the same condition as in Example 1. No generation of damages to molded article C6, including the portions of fine shape such as a socket part of the prototype mold (CPU), was recognized at the releasing time. Further, no generation of cracks was recognized in molded article C6 or sintered article C6'. The results of evaluation on molded article C6 and sintered article C6' are shown in Table 5.

Example 7

In Example 7, slurry A1 was adopted as a molding source material, and forming mold B6 (outer mold and core for molding) was used. After slurry A1 was injected into forming mold B6, slurry A1 was left to stand at room temperature for six hours to gellify and cure slurry A1, thereby forming a molded article C7 in forming mold B6. Subsequently, forming mold B6 together with molded article C7 was put into a dryer and left to stand at 80° C. for a predetermined period of time to melt and discharge the core for molding made of paraffin wax, and thereafter the outer mold was split to release the molded article C7 having a lamp shape. Further, in releasing, means was adopted such that the outer mold was split first to take out the molded article C7 and thereafter the core for molding was melted and discharged. The released molded article C7 was baked under the same condition as in Example 1 to obtain a sintered article C7'.

In any of the two releasing times, no generation of damages to molded article C7 was recognized. Further, no generation of cracks was recognized in molded article C7 or sintered article C7'. The results of evaluation on molded article C7 and sintered article C7' are shown in Table 5.

Example 8

In Example 8, slurry A1 was adopted as a molding source material, and forming mold B7 (outer mold and core for molding) was used. After slurry A1 was injected into forming mold B7, slurry A1 was left to stand at room temperature for six hours to gellify and cure slurry A1, thereby forming a molded article C8 in forming mold B7. Subsequently, acetone was injected into forming mold B7 to dissolve the core for molding made of foamed styrol, and thereafter the outer mold was split and separated to obtain a molded article C8 having a lamp shape. The obtained molded article C8 was baked under the same condition as in Example 1 to obtain a sintered article C8'.

In any of the two releasing times, no generation of damages to molded article C8 was recognized. Further, no generation of cracks was recognized in molded article C8 or sintered article C8'. The results of evaluation on molded article C8 and sintered article C8' are shown in Table 5.

Example 9

In Example 9, slurry A1 was adopted as a molding source material, and forming mold B8 was used. Molded article C9 and sintered article C9' were obtained under the same condition as in Example 1 except that means was adopted to dissolve the forming mold B8 with acetone in releasing the molded article C9 from the forming mold B8. No generation of damages to molded article C9 was recognized at the releasing time. Further, no generation of cracks was recognized in molded article C9 or sintered article C9'. The results of evaluation on molded article C9 and sintered article C9' are shown in Table 5.

Comparative Example

In Comparative Example, slurry A1 was adopted as a molding source material, and forming mold B9 was used. Molded article C10 and sintered article C10' were produced under the same condition as in Example 1. When an attempt was made for releasing, almost all of the heat-dissipating parts (portions having a protruding shape) of the heat sink remained in the forming mold B9, thereby failing to give a desired shape. The results of evaluation on molded article C10 and sintered article C10' are shown in Table 5.

Examples 10 to 17

Slurry A2 to slurry A9 were adopted as a molding source material, and forming mold B1 was used. Molded article C11 to molded article C18 and sintered articles C11' to C18' were produced under the same condition as in Example 1. No generation of damages in molded articles C11 to C18 was recognized at the releasing time. Further, regarding the generation of cracks, although fine cracks were faintly recognized in molded article C18 and sintered article C18' (Example 17), no generation of cracks was recognized in the other molded articles or sintered articles. The results of evaluation on each of the molded articles and each of the sintered articles are shown in Table 6 and Table 7.

TABLE 4

Evaluation on molded articles and sintered articles (Part 1)

| | Examples | | | | |
|---|---|---|---|---|---|
| | Example 1 | Example 2 | Example 3 | Example 4 | Example 5 |
| molded article (C) | C1 | C2 | C3 | C4 | C5 |
| sintered article (C') | C'1 | C'2 | C'3 | C'4 | C'5 |
| Slurry A | A1 | A1 | A1 | A1 | A1 |
| forming mold B | B1 | B2 | B3 | B4 | B1 |
| releasing means | 80° C. heating | 80° C. heating | 80° C. heating | 80° C. heating | 80° C. heating |
| cured state | ○ | ○ | ○ | ○ | ○ |
| released state | ○ | ○ | ○ | ○ | ○ |
| state after drying | ○ | ○ | ○ | ○ | ○ |
| density of sintered article | 3.9 | 3.9 | 3.9 | 3.9 | 3.9 |

(Notes)
density of sintered article: g/cm$^3$
symbol ○: with good evaluation

TABLE 5

Evaluation on molded articles and sintered articles (Part 2)

| | Examples | | | | Comparative Example |
|---|---|---|---|---|---|
| | Example 6 | Example 7 | Example 8 | Example 9 | |
| molded article (C) | C6 | C7 | C8 | C9 | C10 |
| sintered article (C') | C'6 | C'7 | C'8 | C'9 | C'10 |
| Slurry A | A1 | A1 | A1 | A1 | A1 |
| forming mold B | B5 | B6 | B7 | B8 | B9 |
| releasing means | 80° C. heating | 80° C. heating | dissolving with acetone | 80° C. heating | — |
| cured state | ○ | ○ | ○ | ○ | ○ |
| released state | ○ | ○ | ○ | ○ | with residual protruding portions |
| state after drying | ○ | ○ | ○ | ○ | ○ |
| density of sintered article | 3.9 | 3.9 | 3.9 | 3.9 | 3.9 |

(Notes)
density of sintered article: g/cm$^3$
symbol ○: with good evaluation

TABLE 6

Evaluation on molded articles and sintered articles (Part 3)

| | Examples | | | | |
|---|---|---|---|---|---|
| | Example 10 | Example 11 | Example 12 | Example 13 | Example 14 |
| molded article (C) | C11 | C12 | C13 | C14 | C15 |
| sintered article (C') | C'11 | C'12 | C'13 | C'14 | C'15 |
| slurry A | A2 | A3 | A4 | A5 | A6 |
| forming mold B | B1 | B1 | B1 | B1 | B1 |
| releasing means | 80° C. heating | 80° C. heating | 80° C. heating | 80° C. heating | 80° C. heating |
| cured state | ○ | ○ | ○ | ○ | ○ |
| released state | ○ | ○ | ○ | ○ | ○ |
| state after drying | ○ | ○ | ○ | ○ | ○ |
| Density of sintered article | 3.9 | 3.2 | 6.0 | 3.2 | 3.9 |

(Notes)
density of sintered article: g/cm$^3$
symbol ○: with good evaluation

TABLE 7

Evaluation on molded articles and sintered articles (Part 4)

| Examples | Example 15 | Example 16 | Example 17 |
|---|---|---|---|
| molded article (C) | C16 | C17 | C18 |
| sintered article (C') | C'16 | C'17 | C'18 |
| slurry A | A7 | A8 | A9 |
| forming mold B | B1 | B1 | B1 |
| releasing means | 80° C. heating | 80° C. heating | 80° C. heating |
| cured state | ○ | ○ | ○ |
| released state | ○ | ○ | ○ |
| state after drying | ○ | ○ | with fine cracks |
| density of sintered article | 3.9 | 6.0 | 3.9 |

(Notes)
density of sintered article: g/cm$^3$
symbol ○: with good evaluation

Part 2

The hollow ceramic molded article according to the present invention is a precursor for forming a discharge vessel for a high-pressure electric discharging lamp, and the discharge vessel according to the present invention is one formed by baking the hollow ceramic molded article. The discharge vessel for a high-pressure electric discharging lamp is a representative example of a functional hollow ceramic component, and the discharge vessel is one integrally having a hollow body part constituting an electric discharging space and a narrow pipe part constituting an insertion space for inserting an electrode material.

A discharge vessel constituting one embodiment is one of a light-transmitting ceramic quality including a hollow body part having an elliptic sphere shape and a pair of narrow pipe parts integrally molded at two ends that oppose each other on the major axis sides of the body part. In the discharge vessel, the narrow pipe parts are sealed in a state in which a luminous substance is introduced into the body part and a pair of electrode members are inserted through the narrow pipe parts, so as to be formed into a high-pressure electric discharging lamp.

In the high-pressure electric discharging lamp, lamp characteristics such as a color temperature, a lamp efficiency, and a color rendering are requested to be good. These lamp characteristics are greatly affected particularly by the inner shape of the body part of the discharge vessel. For this reason, in discharge vessels, the inner shape of the body part thereof is requested to have a uniform and smooth shape. In other words, in the discharge vessels, it is requested that the body part thereof is molded into a set shape and that the inner shape of the body part is uniform and smooth with no cracks and has a good surface roughness. One of the objects of the present invention is to provide a discharge vessel having such characteristics and a hollow ceramic molded article which is a precursor of the discharge vessel.

For molding the hollow ceramic molded article according to the present invention, the so-called lost wax molding method is adopted and, in the lost wax molding method, a core for molding according to the present invention is used to produce the hollow ceramic molded article. The discharge vessel is produced by baking the hollow ceramic molded article produced by the lost wax method. By baking the hollow ceramic molded article to form a sintered article, one can make a discharge vessel for a high-pressure electric discharging lamp which is a hollow ceramic component having further enhanced functions.

Figure 7:
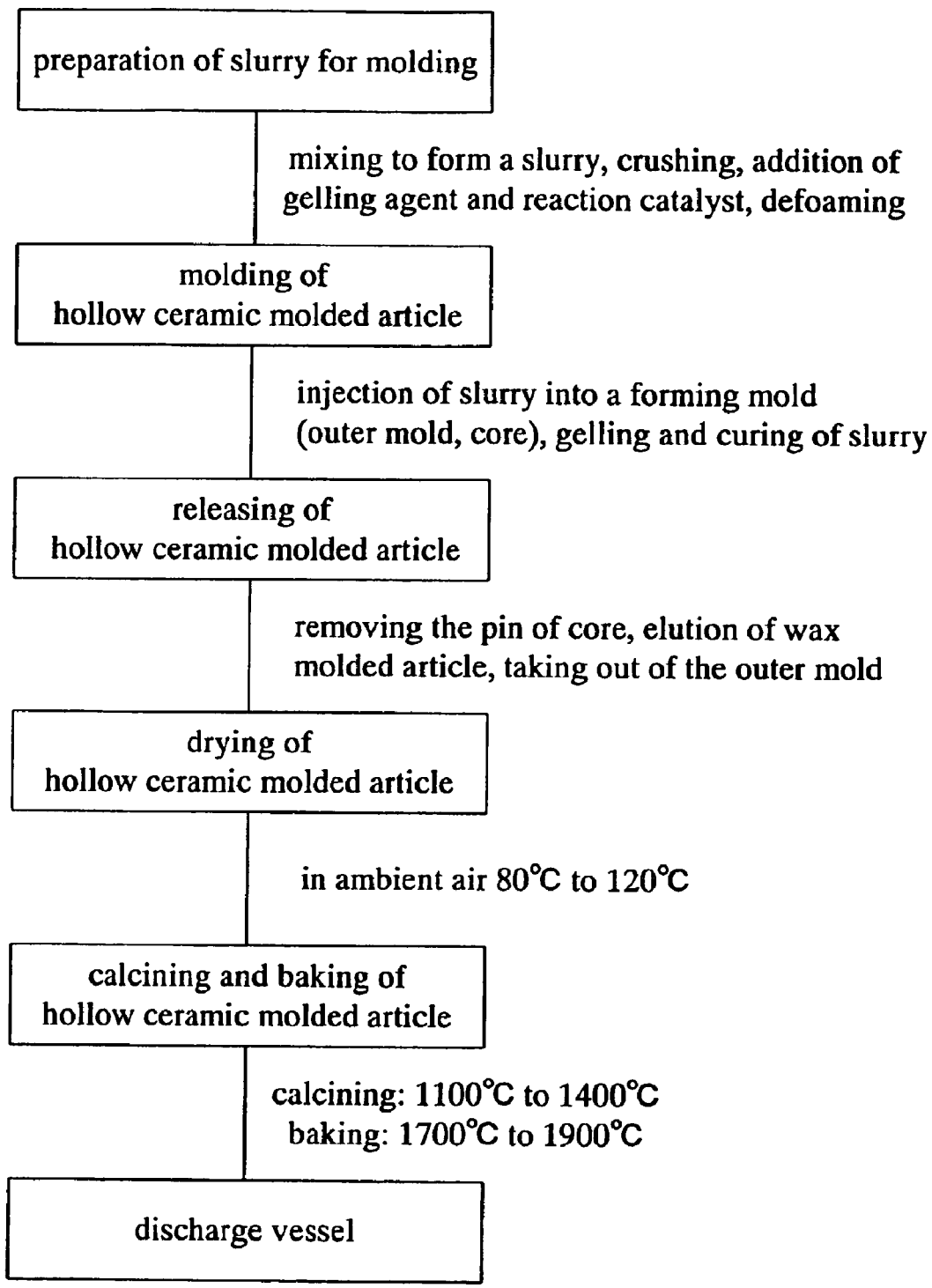
FIG. 7 is a flow of steps showing a production process from the preparation of a slurry for molding according to the present invention till the production of a hollow ceramic component according to the present invention.

FIG. 7 is a flow of steps showing production steps from the preparation of a slurry as a source material for molding through the production of a hollow ceramic molded article to the production of a discharge vessel formed from a precursor made of the hollow ceramic molded article. The production steps show production steps according to one embodiment of the present invention and include a step of preparing a slurry for molding, a step of molding a hollow ceramic, a step of releasing a hollow ceramic molded article, a step of drying the hollow ceramic molded article, and a step of calcining and baking the hollow ceramic molded article. The discharge vessel is produced in accordance with the order of these steps.

The step of preparing a slurry for molding is for preparing a slurry for molding which is a molding material of a hollow ceramic molded article. In the step of preparing a slurry for molding, a slurry is prepared by mixing a source material powder, a dispersion medium, and a dispersing agent with each other, and the prepared slurry is crushed. Thereafter, a gellifying agent and a reaction catalyst are added to carry out a final preparation of the slurry, and this is defoamed and injected into a forming mold. The crushing in the step of preparing the slurry is carried out with the use of a pot mill, a ball mill, or the like, and is carried out at a temperature of 15° C. to 35° C. for 96 hours, preferably 120 hours or more, by using pebbles made of nylon. Further, the defoaming of the slurry is carried out by stirring the slurry in a vacuum atmosphere with a vacuum degree of –0.095 MPa or less, preferably –0.090 MPa or less, and with a stirring speed of 100 rpm to 500 rpm, preferably 250 rpm to 400 rpm, for 2 minutes to 30 minutes, preferably 15 minutes to 25 minutes.

Regarding the forming mold to be used for molding a hollow ceramic molded article, a forming mold composed of a bisectional split-type outer mold made of metal and a core for molding formed with wax is adopted. Further, as the core for molding, a core composed of a wax molded article having an outer shape corresponding to the inner shape of the body part of the hollow ceramic molded article and a pin made of metal having an outer shape corresponding to the inner shape of the narrow pipe part of the hollow ceramic molded article and joined to the wax molded article to protrude from the wax molded article is adopted.

In the step of molding the hollow ceramic molded article, the gel-cast method is adopted, where a prepared slurry is injected into a space part formed by the outer mold and the core for molding of the forming mold and left to stand at a temperature of 5° C. to 50° C., preferably at a temperature of 15° C. to 40° C., for several hours. This gellifies and cures the slurry in the forming mold.

In the step of releasing the hollow ceramic molded article, the hollow ceramic molded article in the forming mold is released from the outer mold and the core for molding. The first means thereof splits the outer mold in a state in which the pin constituting the core for molding has been drawn out from the wax molded article to take the hollow ceramic molded article from the outer mold for housing it in an oven, and leaves the hollow ceramic molded article to stand for 10 minutes or more by setting the temperature within the oven to be 65° C. to 120° C., preferably 80° C. to 100° C. so as to melt and discharge the wax molded article. Further, the second releasing means houses the hollow ceramic molded article together with the forming mold in an oven in a state in which the pin constituting the core for molding has been drawn out from the wax molded article, and leaves the hollow ceramic molded article to stand for 10 minutes or more by setting the temperature within the oven to be 65° C. to 120° C., preferably 80° C. to 100° C. so as to melt and discharge the wax molded article. Thereafter, the hollow ceramic molded article is taken out together with the outer mold from the oven, and the outer mold is split to take out the hollow ceramic molded article.

The step of drying the hollow ceramic molded article is for drying the released hollow ceramic molded article, where the hollow ceramic molded article is housed in an oven in ambient air atmosphere, and is left to stand for 30 minutes or more for drying by setting the temperature within the oven to be 80° C. to 120° C., preferably 90° C. to 100° C.

The step of calcining and baking the hollow ceramic molded article is for converting the hollow ceramic molded article into a sintered article to produce a discharge vessel. In the calcination, the hollow ceramic molded article is baked under an ambient air atmosphere at a temperature raising speed of 200° C./hr or less with the maximum temperature of 1100° C. to 1400° C. for a predetermined period of time. Further, in baking, the hollow ceramic molded article is baked in a hydrogen atmosphere or in a vacuum atmosphere with the maximum temperature of 1700° C. to 1900° C. for a predetermined period of time. This can produce a discharge vessel having a high light transmittance and being excellent in light-transmitting characteristics.

Core for Molding

The core for molding according to the present invention constitutes the forming mold to be used for producing the hollow ceramic molded article according to the present invention. The forming mold is constructed with a split-type outer mold and a core for molding according to the present invention.

The core for molding includes a wax molded article having an outer shape corresponding to the inner shape of the hollow body part, which is a portion constituting the hollow ceramic molded article, and a pin having an outer shape corresponding to the inner shape of the narrow pipe part, which is a portion constituting the hollow ceramic molded article, and joined to the wax molded article to protrude from the wax molded article. The cores for molding are roughly classified into those having a solid pin and those having a hollow pin. In the case of those having a hollow pin, the cores for molding are classified into those without having an ejection outlet of wax and those having an ejection outlet of wax. As a wax for forming the wax molded article, paraffins and aliphatic acid esters having a melting point within the range of 45° C. to 90° C. can be adopted.

Figure 8:
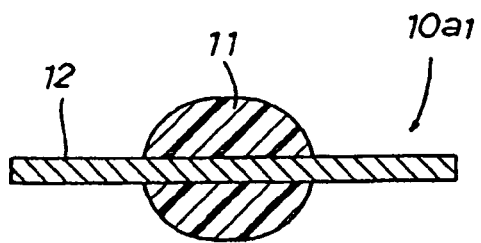
FIG. 8 is a cross-sectional view illustrating one example of the first core for molding according to the present invention.
Figure 9:
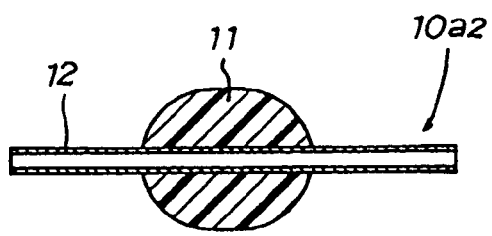
FIG. 9 is a cross-sectional view illustrating another example of the first core for molding according to the present invention.

The core for molding shown in FIG. 8 is a first core 10a1 for molding which is a core for molding made of a hollow wax molded article 11 having an elliptic sphere shape and one pin 12 that pierces through the wax molded article 11 in the major axis direction to protrude, and in which the pin 12 is solid. The core for molding shown in FIG. 9 is a first core 10a2 for molding which is a core for molding made of a hollow wax molded article 11 having an elliptic sphere shape and one pin 12 that pierces through the wax molded article 11 in the major axis direction to protrude, and in which the pin 12 is hollow.

Figure 10:
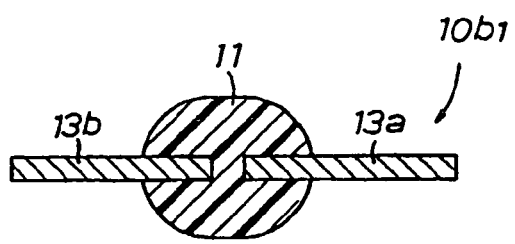
FIG. 10 is a cross-sectional view illustrating one example of the second core for molding according to the present invention.
Figure 11:
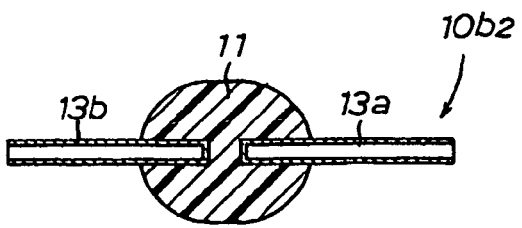
FIG. 11 is a cross-sectional view illustrating another example of the second core for molding according to the present invention.

The core for molding shown in FIG. 10 is a second core 10b1 for molding which is a core for molding made of a hollow wax molded article 11 having an elliptic sphere shape and two pins 13a, 13b that are planted into the wax molded article 11 to protrude in directions opposite to each other in the major axis direction, and in which the pins 13a, 13b are solid. The core for molding shown in FIG. 11 is a second core 10b2 for molding which is a core for molding made of a hollow wax molded article 11 having an elliptic sphere shape and two pins 13a, 13b that are planted into the wax molded article 11 to protrude in directions opposite to each other in the major axis direction, and in which the pins 13a, 13b are hollow.

Figure 12:
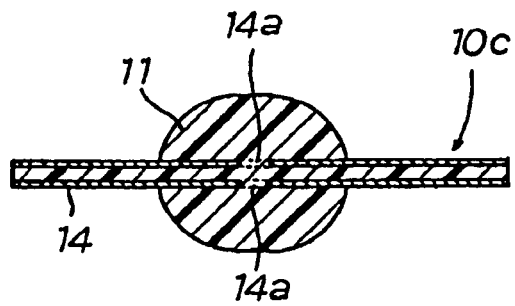
FIG. 12 is a cross-sectional view illustrating the third core for molding according to the present invention.

The core for molding shown in FIG. 12 is a third core 10c for molding which is a core for molding that adopts a hollow pin. In the third core 10c for molding, the pin 14 pierces through the wax molded article 11 in the major axis direction to protrude, in the same manner as in the first core 10a2 for molding shown in FIG. 9. The pin 14 has two ends that are open, and includes a plurality of ejection outlets 14a at a central part thereof in the longitudinal direction. The ejection outlets 14a function as ejection outlets for supplying a molten wax to the cavity of the forming mold at the time of molding the wax molded article 11, so that the pin 14 is eventually in a state of being filled with the wax.

Figure 13:
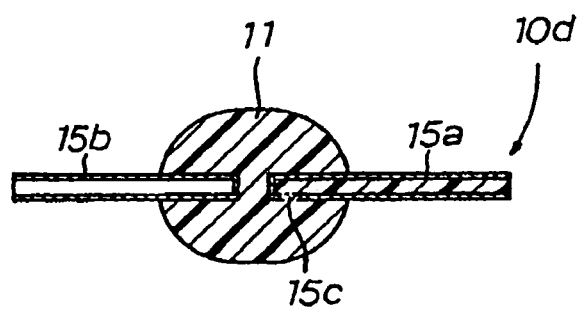
FIG. 13 is a cross-sectional view illustrating the fourth core for molding according to the present invention.

The core for molding shown in FIG. 13 is a fourth core 10d for molding which is a core for molding that adopts a hollow pin. In the fourth core 10d for molding, the two pins 15a, 15b are planted into the wax molded article 11 to protrude in directions opposite to each other in the major axis direction, in the same manner as in the second core 10b2 for molding shown in FIG. 11. Each of the pins 15a, 15b has an inner end that is closed, and one pin 15a includes an ejection outlet 15c in the neighborhood of the inner end. The ejection outlet 15c functions as an ejection outlet for supplying a molten wax to the cavity of the forming mold at the time of molding the wax molded article 11, so that the pin 15a is eventually in a state of being filled with the wax.

Figure 14:
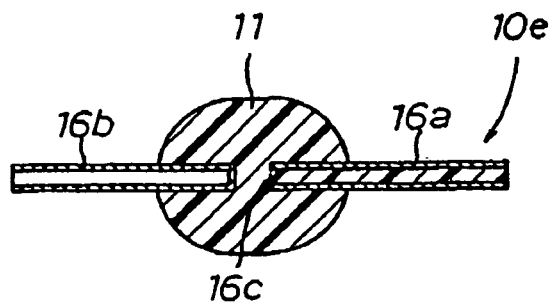
FIG. 14 is a cross-sectional view illustrating the fifth core for molding according to the present invention.

The core for molding shown in. FIG. 14 is a fifth core 10e for molding which is a core for molding that adopts a hollow pin. The fifth core 10e for molding includes two pins 16a, 16b that are planted into the wax molded article 11 to protrude in directions opposite to each other in the major axis direction, in the same manner as the fourth core 10d for molding. In the pins 16a, 16b, one pin 16a has two ends that are open, and the other pin 16b has an inner end that is closed. The opening on the inner end of the one pin 16a functions as an ejection outlet 16c for supplying a molten wax to the cavity of the forming mold at the time of molding the wax molded article 11, so that the pin 16a is eventually in a state of being filled with the wax.

These cores 10a to 10e for molding correspond to the first core for molding of the cores for molding according to the present invention. In the adopted pins 12 to 16a, 16b, the surface roughness (Ra) of the pins is set to be within the range from 0.1 to 3.2; the adhesion strength of the pins 12 to 16a, 16b to the wax molded article 11 is set to be within the range from 0.1 kg to 2 kg; and the gap formed in the wax molded article 11 by drawing out the pins 12 to 16a, 16b is set to be at least 1 vol % of the volume occupied by the wax molded article 11.

Figure 15:
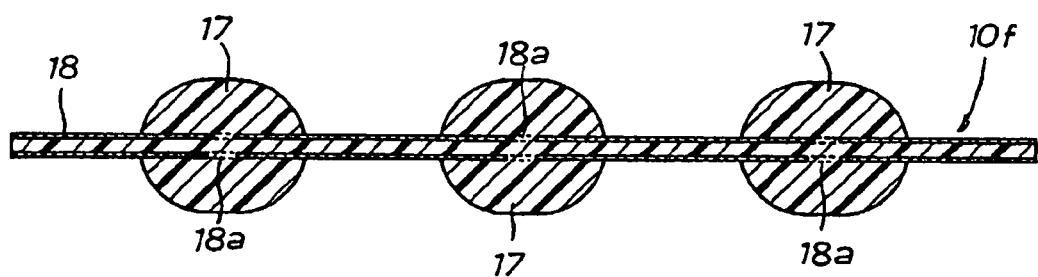
FIG. 15 is a cross-sectional view illustrating the sixth core for molding according to the present invention.

The core for molding shown in FIG. 15 is a sixth core 10f for molding which corresponds to the second core for molding of the cores for molding according to the present invention. The sixth core 10f for molding is used in the case of simultaneously molding a plurality of hollow ceramic molded articles, and is constructed with a plurality of wax molded articles 17 and one long pin 18 that pierces through the wax molded articles 17 in the major axis direction to protrude. The pin 18 is a hollow pin having two ends that are open, and includes ejection outlets 18a at portions corresponding to the wax molded articles 17 in the pin 18.

The ejection outlets 18a that the pin 18 has function as ejection outlets for supplying a molten wax to the cavity of the forming mold at the time of molding the wax molded articles 17, so that the pin 18 is eventually in a state of being filled with the wax. In the pin 18, the surface roughness (Ra) of the pin is set to be within the range from 0.1 to 3.2; the adhesion strength of the pin 18 to the wax molded articles 17 is set to be within the range from 0.1 kg to 2 kg; and the gap formed in the wax molded articles 17 by drawing out the pin 18 is set to be at least 1 vol % of the volume occupied by the wax molded articles 17.

Production of Core for Molding

The methods of producing cores for molding according to the present invention are roughly classified into the first production method for producing a core for molding that includes a pin without having an ejection outlet of wax, the second production method for producing a core for molding that includes a pin having an ejection outlet for molding, and the third production method for producing a core for molding that has a plurality of wax molded articles.

The first production method is a method of producing, for example, the first cores 10a1, 10a2 for molding and the second cores 10b1, 10b2 for molding shown in FIGS. 8 to FIG. 11. As the pin, a pin without having an ejection outlet of wax is adopted. As the forming mold, a forming mold having a cavity corresponding to the outer shape of the wax molded article and a space part being in communication with the cavity for housing the pin is adopted. A wax in a molten state is supplied to the cavity through a wax injection passageway disposed in the forming mold in a state in which the pin is housed in the forming mold.

Figure 16:
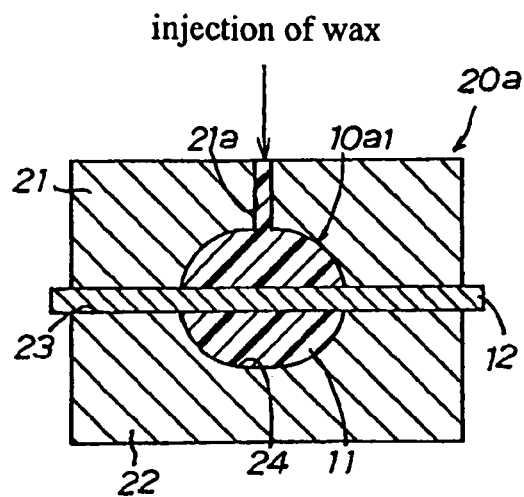
FIG. 16 is a descriptive view illustrating a method of producing the first core for molding according to the present invention.

FIG. 16 shows a method of producing the first core 10a1 for molding, and a half-splitting type forming mold 20a is adopted as the forming mold. The forming mold 20a is constructed with two molds 21, 22, and forms a space part 23 for housing a pin 12 and a cavity 24 having an outer shape of the wax molded article in a state in which the two molds 21, 22 are joined with each other. Further, one mold 21 includes an injection hole 21a for supplying a molten wax.

In order to produce the core 10a1 for molding, the pin 12 is set in the space part 23 of the forming mold 20a to join the two molds 21, 22, and thereafter the wax in a molten state is supplied into the cavity 24 through the injection hole 21a (See the arrow symbol). This molds a wax molded article 11 on the outer circumference of the pin 12, thereby producing the core 10a1 for molding. The core 10a1 for molding is released and taken out when the wax molded article 11 is cooled and solidified. In the produced core 10a1 for molding, the wax molded article 11 has a smooth outer circumferential surface corresponding to the inner circumferential surface of the cavity 24, and is joined to the pin 12 at a suitable strength. Here, the second core 10b1 for molding can be produced in a method similar to this.

In the case of producing the cores 10a2, 10b2 for molding in which the pin is a hollow pin, the hollow pin produces good functions and effects on the wax molded article to be formed on the outer circumference thereof. Namely, in order to form a core for molding, a heated and melted wax is injected onto the outer circumference side of the pin in the cavity 24 of the forming mold 20a and this is cooled and solidified, as described above. Now, at this stage, the molded wax molded article 11 gradually shrinks to pinch the pin, resulting in a possibility that cracks may be generated in the wax molded article 11. However, if the pin is a hollow pin such as the pins 12, 13a, 13b, the hollow pins 12, 13a, 13b are deflected by a pinching force imparted from the wax molded article 11 to alleviate the pinching force, thereby functioning to prevent the generation of cracks in the wax molded article 11.

The second method for producing a core for molding according to the present invention is a method of producing a core for molding in which a pin having an ejection outlet of wax is adopted as the pin, and is a method of producing, for example, the third core 10c for molding, the fourth core 10d for molding, and the fifth core 10e for molding shown in FIG. 12 to FIG. 14.

Figure 17:
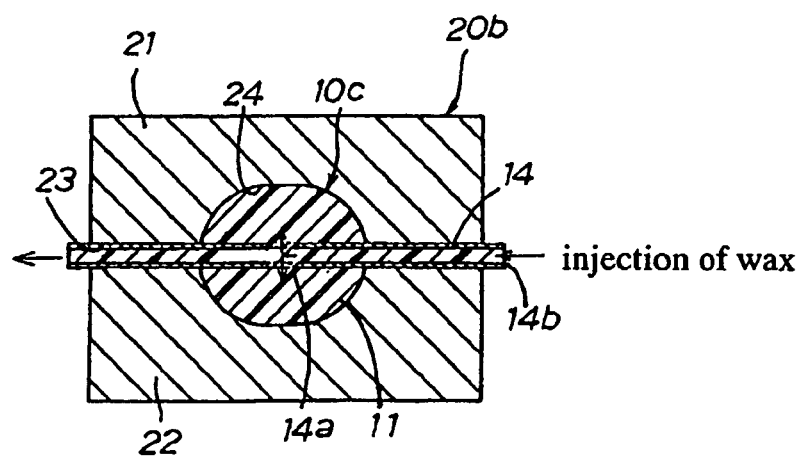
FIG. 17 is a descriptive view illustrating a method of producing the third core for molding according to the present invention.

FIG. 17 shows a method of producing the third core 10c for molding, in which a half-splitting type forming mold 20b is adopted as the forming mold, in the same manner as the forming mold 20a. However, since the injection hole for supplying a molten wax into the cavity 24 is unnecessary in the forming mold 20b, the forming mold 20b does not include an injection hole.

In order to produce the core 10c for molding, the pin 14 is set in the space part 23 of the forming mold 20b, and the two molds 21, 22 are joined. Subsequently, a wax is injected in a molten state through the opening part 14b on one end of the pin 14 (See an arrow symbol). The molten wax injected through the opening part 14b passes through an inner hole of the pin 14 to reach the ejection outlet 14a and supplied from the ejection outlet 14b into the cavity 24 of the forming mold 20b.

This forms a wax molded article 11 on the outer circumference of the pin 14, whereby the core 10c for molding is produced. The core 10c for molding is released and taken out when the wax molded article 11 is cooled and solidified. In the produced core 10c for molding, the wax molded article 11 has a smooth outer circumferential surface corresponding to the inner circumferential surface of the cavity 24, and is joined to the pin 14 at a suitable strength. Here, the fourth core 10d for molding and the fifth core 10e for molding can be produced in a manner similar to this.

According to the production method, the supply of molten wax into the cavity 24 of the forming mold 20b is carried out through the inner hole of the pin 14 from the ejection outlet 14a thereof, so that traces of the wax ejection outlet (gate traces) such as burrs do not remain on the outer circumferential surface of the wax molded article 11 to be molded, thereby eliminating the need for removing the gate traces. For this reason, the outer circumferential surface of the wax molded article 11 is formed into a highly smooth surface without having a rough non-smooth surface part caused by the removal of the gate traces, and there will be no variations in the volume of the wax molded article 11 due to the removal of the gate traces.

In other words, the wax molded article 11 of the core 10c for molding will have an outer circumferential surface with a set size and a set high smoothness. By using a core 10c for molding having such a wax molded article 11, one can mold a hollow ceramic molded article in which the inner and outer shapes of the body part are highly controlled.

The third production method for producing a core for molding according to the present invention is a method of producing a core for molding having a plurality of wax molded articles, and is a method of producing, for example, the sixth core 10f for molding shown in FIG. 15.

Figure 18:
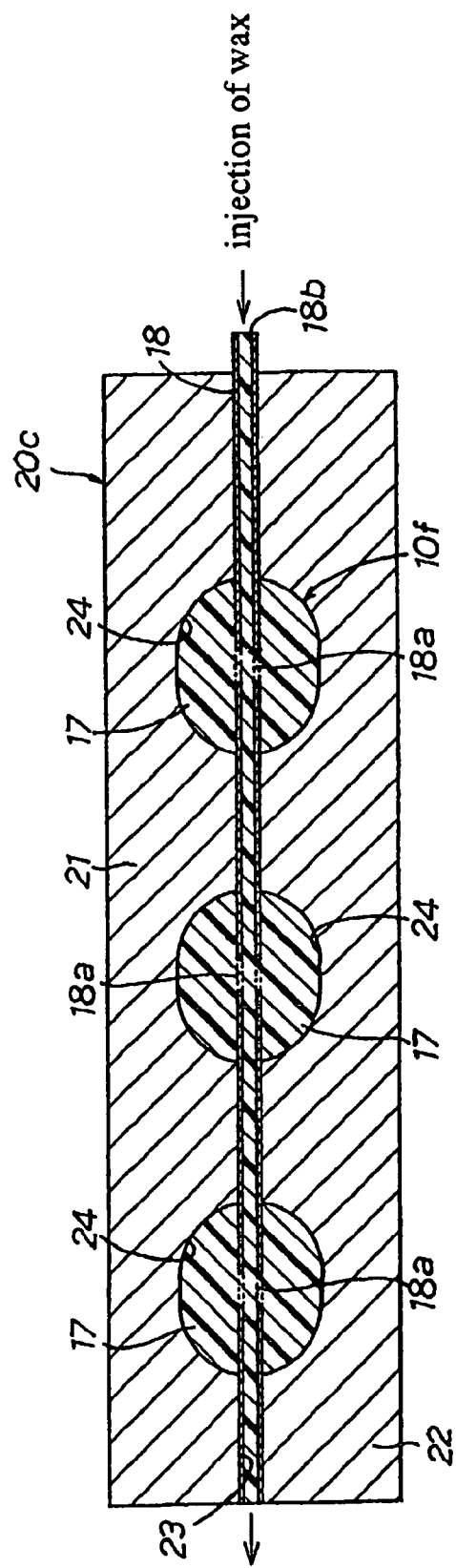
FIG. 18 is a descriptive view illustrating a method of producing the sixth core for molding according to the present invention.

FIG. 18 shows a method of producing the sixth core 10f for molding, where a half-splitting type forming mold 20c is adopted as the forming mold, in the same manner as the forming molds 20a, 20b. However, the forming mold 20c is not provided with an injection hole for supplying a molten wax into the cavity 24, although the forming mold 20c is provided with cavities 24 in a number corresponding to the wax molded articles 17. Each cavity 24 is in a state in which the space part 23 for housing the pin 18 is pierced through.

In order to produce the sixth core 10f for molding, the pin 18 is set in the space part 23 of the forming mold 20c, and the two molds 21, 22 are joined. Subsequently, a wax is injected in a molten state through an opening part 18b on one end of the pin 18 (See an arrow symbol). The molten wax injected through the opening part 18b passes through the inner hole of the pin 18 to reach the ejection outlets 18a and supplied from the ejection outlets 18a into the cavities 24 of the forming mold 20c.

This forms each wax molded article 17 on the outer circumference of the pin 18, whereby the core 10f for molding is produced. The core 10f for molding is released and taken out when the wax molded articles 17 are cooled and solidified. In the produced core 10f for molding, the wax molded articles have a smooth outer circumferential surface corresponding to the inner circumferential surfaces of the cavities 24, and are joined to the pin 18 at a suitable strength.

Discharge Vessel

The discharge vessel according to the present invention is a discharge vessel for a high-pressure electric discharging lamp and is a sintered article formed from a precursor made of a hollow ceramic molded article according to the present invention. The discharge vessel is produced by baking the hollow ceramic molded article.

Figure 19:
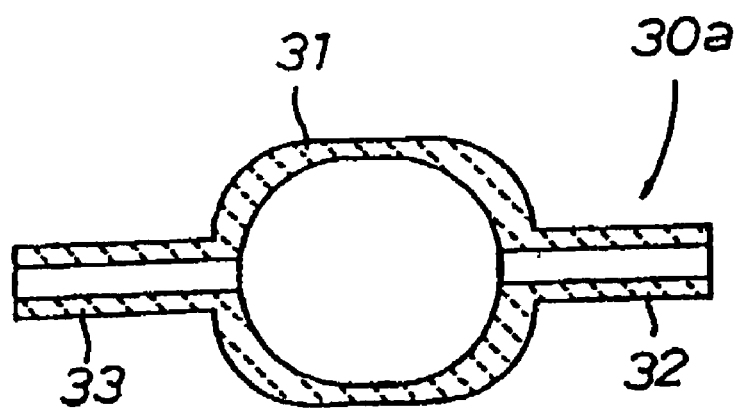
FIG. 19 is a cross-sectional view illustrating a hollow ceramic component (discharge vessel) according to one example of the present invention.
Figure 20:
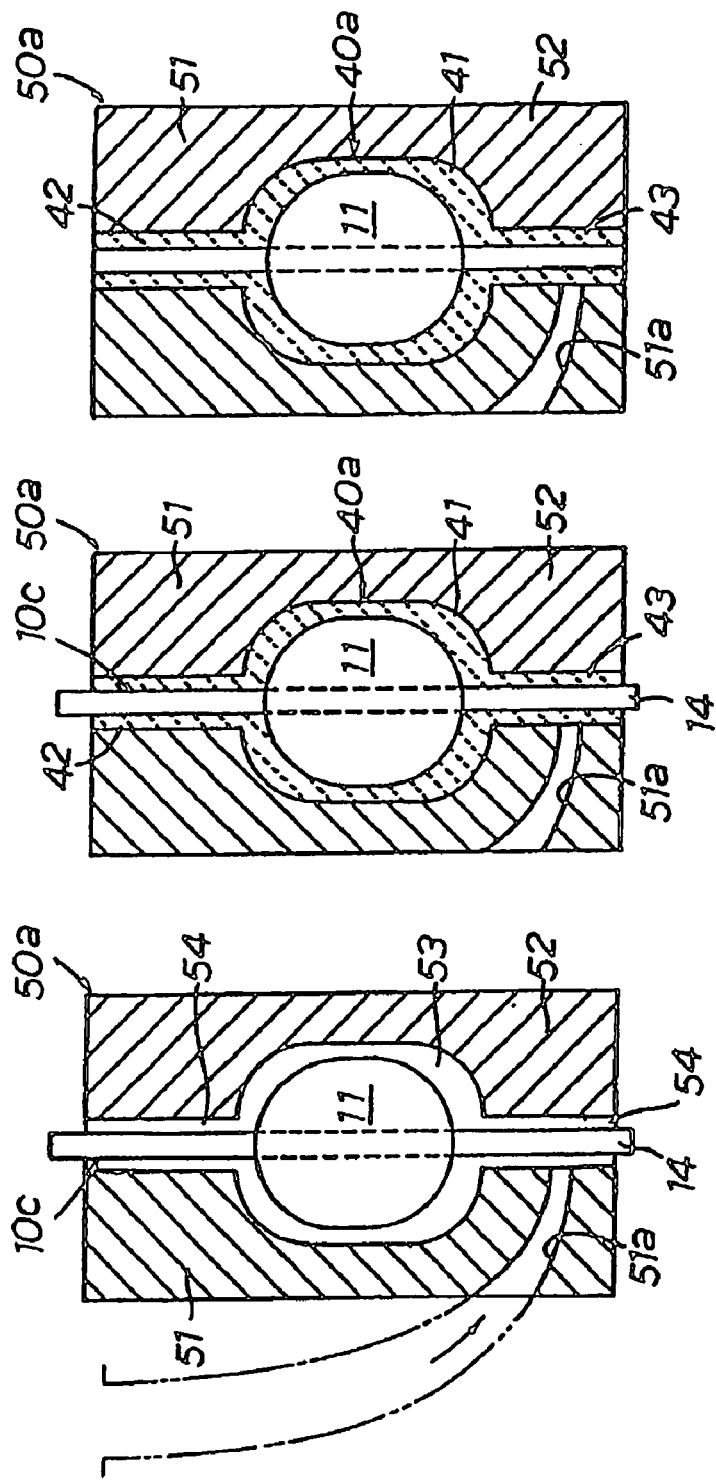
FIG. 20 is a view of steps in the former half of the production steps for producing a hollow ceramic molded article according to one example of the present invention.
Figure 21:
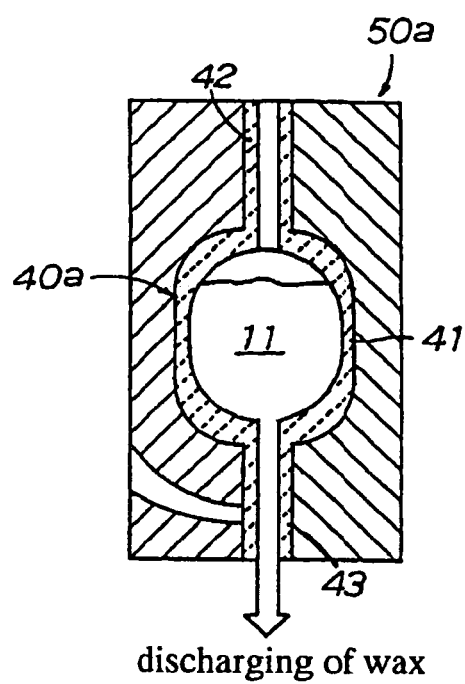
FIG. 21 is a view of steps in the latter half of the production steps.
Figure 21:
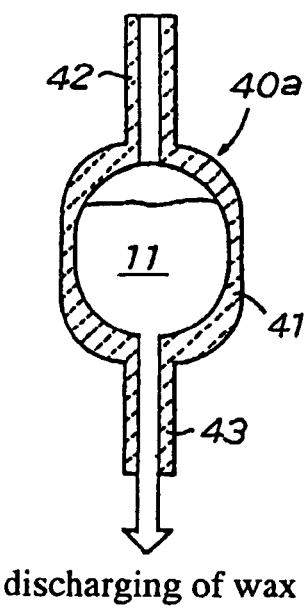
Figure 22:
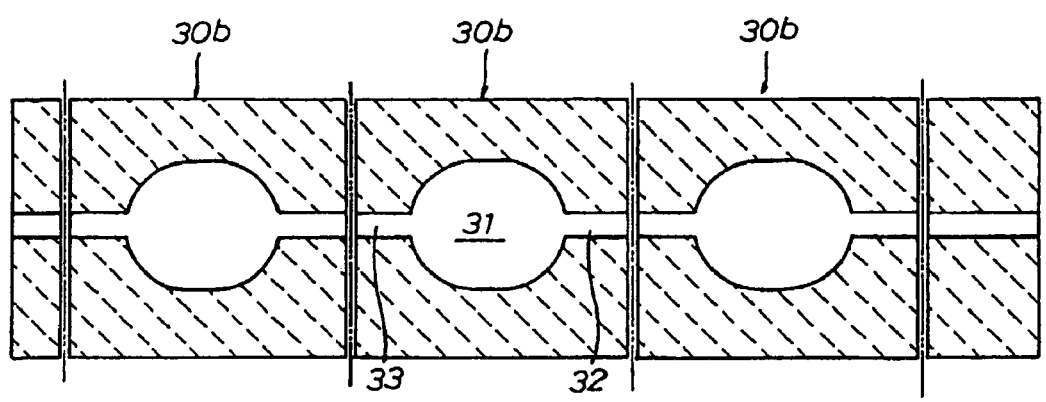
FIG. 22 is a cross-sectional view of plural discharge vessels according to another example of the present invention.

The discharge vessel 30a shown in FIG. 19 shows one example of a discharge vessel according to the present invention and is formed from a precursor made, for example, of a hollow ceramic molded article 40a that is produced by the methods shown in FIG. 20 and FIG. 21. Further, the discharge vessel 30b shown in FIG. 22 shows another example of a discharge vessel according to the present invention and is formed from a precursor made, for example, of a hollow ceramic molded article 40b that is formed by splitting a group 40b1 of the hollow ceramic molded articles produced by the methods shown in FIG. 23 and FIG. 24. The discharge vessels 30a, 30b are formed by calcining the hollow ceramic molded articles 40a, 40b at 1200° C. in an ambient air atmosphere for 3 hours and then baking them at 1850° C. in a hydrogen atmosphere for 3 hours. The discharge vessels 30a, 30b (sintered articles) formed by baking the hollow ceramic molded articles 40a, 40b are of light-transmitting ceramic quality having a hollow body part 31 and a pair of tube-shaped narrow pipe parts 32, 33 that is integral with the body part 31.

In the discharge vessels 30a, 30b, the narrow pipe parts 32, 33 are sealed in a state in which a luminous substance is introduced into the body part 31 thereof and a pair of electrode members are inserted through the narrow pipe parts 32, 33, thereby being formed into a high-pressure electric discharging lamp. In the high-pressure electric discharging lamp, lamp characteristics such as a color temperature, a lamp efficiency, and a color rendering are requested to be good. These lamp characteristics are greatly affected particularly by the inner shape of the body part 31 of the discharge vessels 30a, 30b.

In discharge vessels 30a, 30b, therefore, the inner shape of the body part 31 thereof is requested to have a uniform and smooth shape. In other words, in the discharge vessels 30a, 30b, it is requested that the body part 31 thereof is molded into a set shape and that the inner shape of the body part 31 is uniform and smooth with no cracks and has a good surface roughness.

Hollow Ceramic Molded Articles

Figure 24:
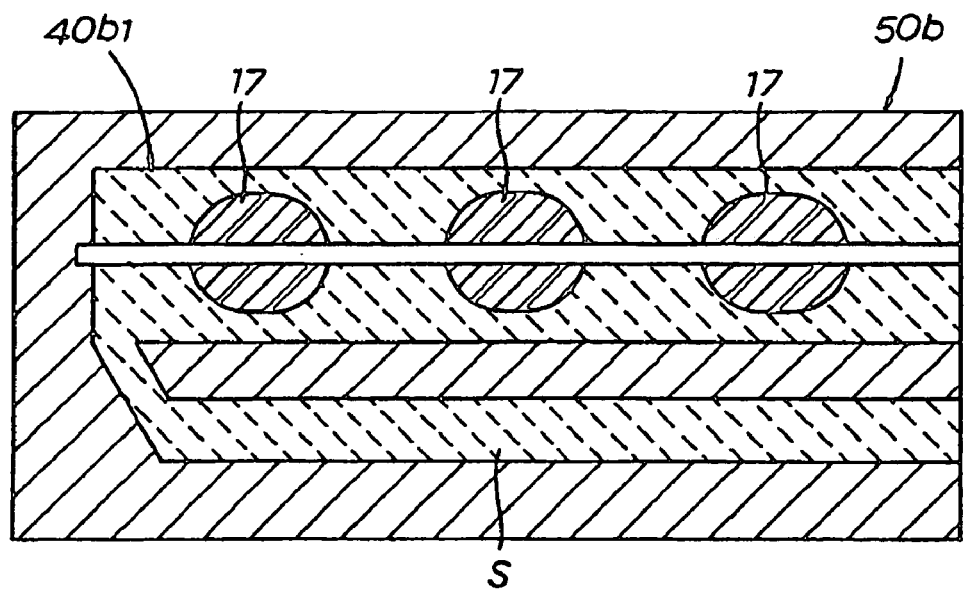
FIG. 24 is a view of steps in the latter half of the production steps.
Figure 24:
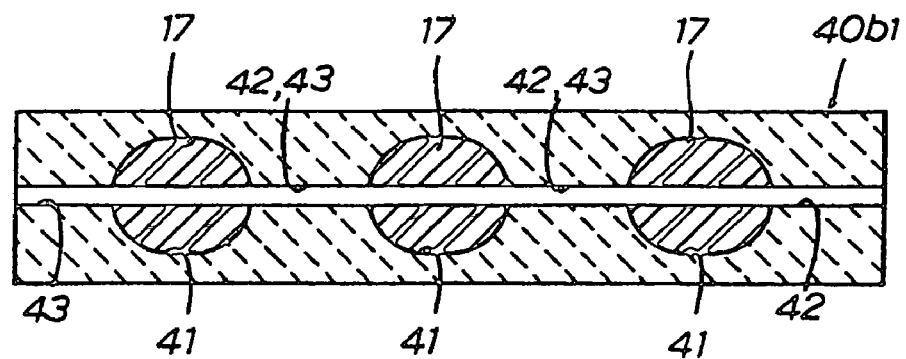

The hollow ceramic molded article 40a which is a precursor of the discharge vessel 30a includes a body part 41 corresponding to the body part 31 of the discharge vessel 30a and narrow pipe parts 42, 43 corresponding to the narrow pipe parts 32, 33 of the discharge vessel 30a, as shown in FIG. 20 and FIG. 21. Likewise, the hollow ceramic molded article 40b which is a precursor of the discharge vessel 30b includes a body part 41 and narrow pipe parts 42, 43 in the same manner as the hollow ceramic molded articles 40a, though the shapes are different, as shown in FIG. 24.

Because of being closely related to the discharge vessels 30a, 30b (sintered articles of the hollow ceramic molded articles 40a, 40b), the hollow ceramic molded articles 40a, 40b are requested to have the same characteristics as the discharge vessels 30a, 30b. Namely, in the discharge vessels 40a, 40b, it is requested that the body part 41 thereof is molded into a set shape and that the inner shape of the body part 41 is uniform and smooth with no cracks and has a good surface roughness.

Production of Hollow Ceramic Molded Articles

In the production of the hollow ceramic molded articles according to the present invention, one of the above-described first core 10a for molding to sixth core 10f for molding is adopted as a core for molding and, as a slurry for molding, it is mandatory and essential to adopt a slurry that contains at least a ceramic powder, a dispersion medium, and a gellifying agent and can be gellified and cured. In the production of the hollow ceramic molded article 40a, the third core 10c for molding, for example, is adopted. Further, in the production of the hollow ceramic molded articles 40b, the sixth core 10f for molding is adopted, since a plurality thereof are molded as a group 40b1.

Slurry for Molding the Hollow Ceramic Molded Articles

As a ceramic powder, one can mention powders such as alumina, yttria, aluminayttriagarnet, quartz, silicon nitride, silicon carbide, aluminum nitride, zirconia, and SIALON. For producing a hollow ceramic molded article which is a precursor of a discharge vessel, one can mention powders and others of light-transmitting ceramic such as alumina, yttria, aluminayttriagarnet, and quartz. This can produce a ceramic molded article suitable as a precursor of a discharge vessel for a high-pressure electric discharging lamp.

As a dispersion medium, one can mention non-reactive dispersion media that do not react with a gellifying agent, such as ether, hydrocarbons, and toluene, and reactive dispersion media that have at least one reactive functional group and react with a gellifying agent, for example, diols such as ethylene glycol, triols such as glycerine, polybasic acid esters such as dimethyl glutarate, polyhydric alcohol acid esters such as triacetylene, and others.

As a gellifying agent, one can mention monomers, oligomers, polymers, and prepolymers that are three-dimensionally cross-linked by addition of a cross-linking agent, such as polyvinyl alcohol, epoxy resins, and phenolic resins. Among these, it is preferable to adopt those having an isocyanate group and/or an isothiocyanate group having a high reactivity with a reactive dispersion medium.

The dispersion media and the gellifying agents constituting the slurry for molding of the hollow ceramic molded article are common to the items described in detail in the slurry-for-molding section in the "Detailed Description of the Invention (Part 1)", and it is preferable to appropriately use the dispersion media and the gellifying agents mentioned in the section. Further, in order to prepare the slurry for molding, one can add a cross-linking agent, a reaction catalyst, a dispersing agent, and others, as described in detail in the section. As the slurry for molding, one can appropriately make a selection for use from among slurry A1 to slurry A9 mentioned in the section.

In preparing a slurry for molding, a ceramic powder is dispersed into a dispersion medium to make a slurry and thereafter a gellifying agent is added, or alternatively a ceramic powder and a gellifying agent are simultaneously added into a dispersion medium for dispersion to make a slurry. In this case, if a non-reactive dispersion medium is to be adopted as a dispersion medium, a cross-linking agent is added to the slurry just before the slurry is injected into a forming mold, so as to crosslink the gellifying agent in the slurry three-dimensionally for gellification to cure the slurry.

The slurry for molding preferably has a viscosity at 20° C. of 5 ps or less, more preferably 3 ps or less, in view of the workability of the injection work into the forming mold. The viscosity of the slurry can be adjusted also by the type of the ceramic powder, the amount of the dispersion medium, the concentration of the ceramic powder in the slurry (slurry concentration), and the like, besides the viscosities of the dispersion medium and the gellifying agent. If the slurry has a low concentration, the hollow ceramic molded article will have a low density to decrease its strength, thereby raising problems such as generation of cracks and generation of deformation by increase of the degree of shrinkage at the time of drying or at the time of baking for forming a discharge vessel. Therefore, the slurry concentration of the slurry for molding is preferably 25 to 75 vol % and, in order to prevent generation of cracks by drying shrinkage or heat shrinkage, the slurry concentration is more preferably 35 to 75 vol %.

Here, in the slurry for molding, one can add additives other than a dispersion medium or a gellifying agent, for example, a catalyst for promoting the reaction between the dispersion medium and the gellifying agent, a dispersing agent, an anti-foaming agent, and a surfactant for facilitating the preparation of the slurry, a sintering aid for improving the characteristics of the sintered article, and the like, as long as no problem is raised in the molding. For the use of these agents, it is preferable to make a reference to the items described in the "Detailed Description of the Invention (Part 1)" section.

The slurry for molding, before being injected into the forming mold, maintains a low viscosity and a high fluidity and, after being injected into the forming mold, the slurry for molding is gellified and cured to be formed into a hollow ceramic molded article having a sufficient strength to withstand the handling. As means for gellifying the slurry for molding in the forming mold, one can adopt means for leaving the slurry for molding for a predetermined period of time, means for raising and maintaining the temperature of the slurry to a predetermined temperature, and other means, after being injected into the forming mold as it is or in a state in which a gellifying reaction catalyst is added. This allows that the slurry for molding is gellified and cured by chemically bonding a reactive dispersion medium and a gellifying agent, or by chemically bonding a non-reactive dispersion medium and a gellifying agent through the intermediary of a cross-linking agent.

Molding a Hollow Ceramic Molded Article

In molding a hollow ceramic molded article, a core for molding is set into a forming mold (corresponding to an outer mold), and the above-mentioned slurry for molding is injected into a space part formed around the outer circumference of the core for molding in a chamber of the forming mold, for being gellified and cured. Subsequently, the pin constituting the core for molding is drawn out and removed from the wax molded article, and thereafter, the wax molded article is discharged from within the hollow ceramic molded article by being heated and melted. The wax molded article can be discharged from the hollow ceramic molded article either in a state in which the hollow ceramic molded article remains in the forming mold or in a state in which the hollow ceramic molded article is released from the forming mold.

FIG. 20 and FIG. 21 each show a production step for producing a hollow ceramic molded article 40a, where a split-type forming mold 50a made of a pair of outer molds 51, 52 is adopted. In producing the hollow ceramic molded article 40a, the core 10c for molding is placed in the two outer molds 51, 52 constituting the forming mold 50a, and each end of the pin 14 constituting the core 10c for molding is sandwiched and held by the two outer molds 51, 52 through the intermediary of a supporting member (not illustrated), as shown in the left view of FIG. 20.

This sets the core 10c for molding in the forming mold 50a, forms a space part 53 corresponding to the inner shape and outer shape of the body part 41 of the hollow ceramic molded article 40a in the cavity of the forming mold 50a between the inner circumferential surface thereof and the outer circumferential surface of the wax molded article 11, and forms a space part 54 corresponding to the inner shape and outer shape of the narrow pipe parts 42, 43 of the hollow ceramic molded article 40a in the cavity between the inner circumferential surface thereof and the outer circumferential surface of the pin 14. In the space part 54, a slurry injection hole 51a formed in one outer mold 51 is open.

The center view of FIG. 20 shows a slurry injection step for injecting the slurry for molding into the space parts 53, 54 of the forming mold 50a. In the slurry injection step, the slurry for molding is injected into the space parts 53, 54 through the slurry injection hole 51a of the forming mold 50a. This allows that the slurry for molding is supplied to and fills the space parts 53, 54. If this state is left to stand for a predetermined period of time, the slurry for molding is gellified and cured, whereby a hollow ceramic molded article 40a is formed in the two space parts 53, 54.

The right view of FIG. 20 shows a pin drawing step of drawing out the pin 14 constituting the core 10c for molding to take out the pin 14 from the forming mold 50a after the hollow ceramic molded article 40a is molded, where the pin 14 is drawn out from the wax molded article 11 and taken out from the forming mold 50a. This allows a gap 11a having a volume corresponding to the volume occupied by the pin 14 to remain in the inside of the wax molded article 11 in the hollow ceramic molded article 40a. The remaining gap 11a functions to alleviate the stress imposed on the hollow ceramic molded article 40a due to thermal expansion at the time of heating and melting the wax molded article 11.

The right and left views of FIG. 21 each show a wax discharging step of discharging the wax molded article 11 remaining in the inside of the hollow ceramic molded article 40a by heating and melting. In the discharging step shown in the left view of FIG. 21, the wax molded article 11 is heated from the outer circumference of the forming mold 50a. This allows that the wax molded article 11 is melted and discharged to the outside through the other narrow pipe part 43 of the hollow ceramic molded article 40a. In this case, if an extruding pressure is imparted from the one narrow pipe part 42 of the hollow ceramic molded article 40a, the molten wax can be discharged from the hollow ceramic molded article 40a in a short period of time. Thereafter, the hollow ceramic molded article 40a is released from the forming mold 50a and baked to be converted into a discharge vessel 30a.

The right view of FIG. 21 shows a wax discharging step of discharging the wax molded article 11 by heating and melting in a state in which the hollow ceramic molded article 40a is released from the forming mold 50a. In the discharging step shown in the view, the hollow ceramic molded article 40a released from the forming mold 50a is heated from the outer circumference thereof, whereby the wax molded article 11 is melted and discharged to the outside through the other narrow pipe part 43 of the hollow ceramic molded article 40a. In this case, in order to prevent generation of cracks in the hollow ceramic molded article 40a due to thermal expansion of the heated wax, it is preferable to heat and melt the wax molded article 11 under an atmospheric pressure higher than at the time of curing the slurry by using a pressure vessel or the like.

Figure 23:
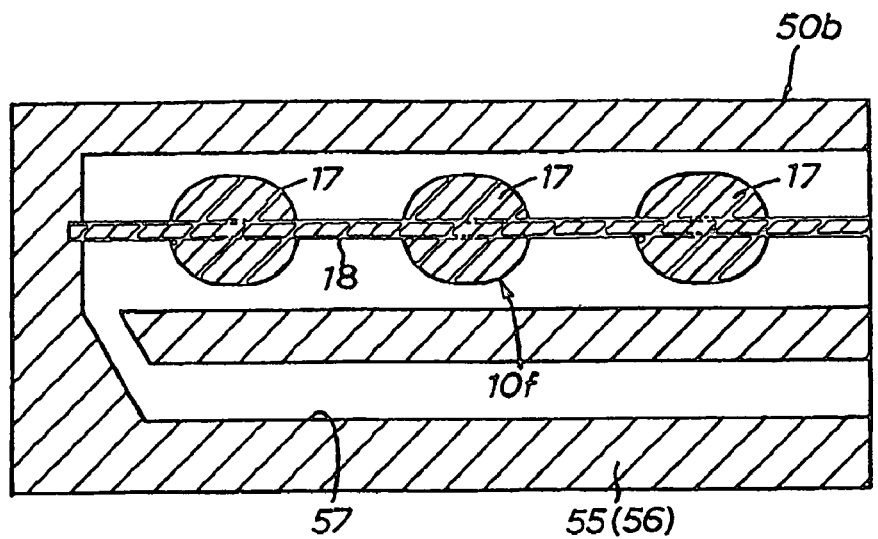
FIG. 23 is a view of steps in the former half of the production steps for producing a hollow ceramic molded article according to another example of the present invention.
Figure 23:
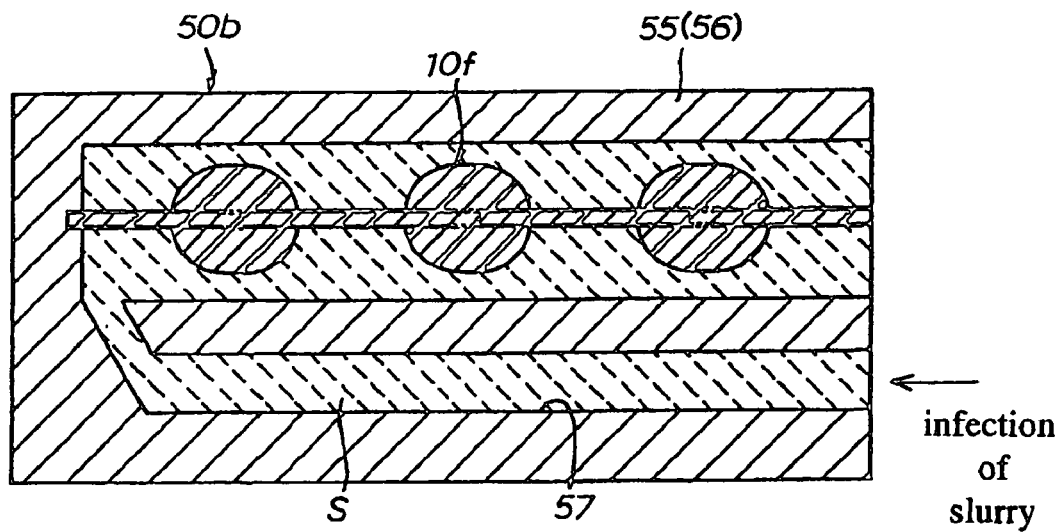

FIG. 23 and FIG. 24 each show a production step for producing a group 40b1 integrally having a plurality of hollow ceramic molded articles 40b, where a split-type forming mold 50b made of a pair of outer molds 55, 56 is adopted. The forming mold 50b has substantially the same function as the forming mold 50a except that the forming mold 50b has a plurality of cavities corresponding to the group 40b1. However, FIG. 23 and FIG. 24 show a plane state in which the upper mold 56 has been removed.

In producing the group 40b1, the core 10f for molding is set in the two outer molds 55, 56 of the forming mold 50b, as shown in the top view of FIG. 23. Subsequently, when a slurry for molding is injected through the injection hole 57 as shown in the bottom view of FIG. 23 (see an arrow symbol), the slurry for molding is supplied to and fills the cavity of the forming mold 50b. If this state is left to stand for a predetermined period of time, the slurry for molding is gellified and cured, whereby a group 40*b*1 is molded in the forming mold 50*b*. Here, the symbol S in the view shows the slurry for molding.

In order to discharge the core 10*f* for molding in the molded group 40*b*1, the pin 18 constituting the core 10*f* for molding is first drawn out from the group 40*b*1 existing in the forming mold 50*b*, as shown in the top view of FIG. 24. Subsequently, the group 40*b*1 is released from the forming mold 50*b* as shown in the bottom view of FIG. 24, and the group 40*b*1 is heated from the outer circumference. This allows the wax molded article 17 in the group 40*b*1 to be melted and discharged.

Since the core for molding used in the production of a hollow ceramic molded article or a group of hollow ceramic molded articles remains in the inside of the molded article after the hollow ceramic molded article is molded, the pin is drawn out and taken out before releasing the hollow ceramic molded article, and the wax molded article is heated and melted to be discharged, in a molten state, from the inside of the hollow ceramic molded article before releasing or after releasing the hollow ceramic molded article.

For this reason, in the core for molding, the wax molded article is requested to have a shape-retaining property and a melting property that allows melting at a suitable temperature, and the pin is requested to have a suitable adhesion-retaining property and a suitable escaping property to the wax molded article. Therefore, the wax for forming the wax molded article is preferably a paraffin or an aliphatic acid ester having a melting point of 45° C. to 90° C. Further, the pin is preferably made of metal in view of the strength of the pin itself, affinity to the wax, and the like, and preferably is one in which the outer circumferential surface of the pin has a suitable surface roughness.

Regarding the joining of the pin and the wax molded article, it is generally presumed that the adhesion strength is higher according as the outer circumferential surface of the pin is rougher, and the adhesion strengths is lower according as the outer circumferential surface of the pin is smoother. In view of this point, it is essential that the surface roughness of the outer circumferential surface of the pin (which is referred to as pin surface roughness) is $Ra \geq 0.1$. However, regarding the cores for molding adopted in the production methods according to the present invention, it has been found out that, if the pin surface roughness Ra is within the range from 3.2 to 12.5, one cannot obtain a sufficient adhesion strength of the pin to the wax molded article.

This is presumed to be due to the following reason. If the pin surface roughness Ra is within the range from 3.2 to 12.5, the wax will not fill the recesses of the pin surface sufficiently down to the bottoms of the recesses during the molding of the wax molded article, since the unevenness of the outer circumferential surface of the pin is too small. As a result of this, the adhesion area will be substantially smaller than in the case where the pin surface roughness Ra is 3.2 or less. Further, it has also been found out that, if the pin surface roughness Ra is 6.3 or more, the friction between the pin and the inside of the narrow pipe part of the hollow ceramic molded article will increase, and the load in drawing the pin out from the hollow ceramic molded article will be large, thereby increasing a possibility of damaging the narrow pipe part of the hollow ceramic molded article.

Figure 25:
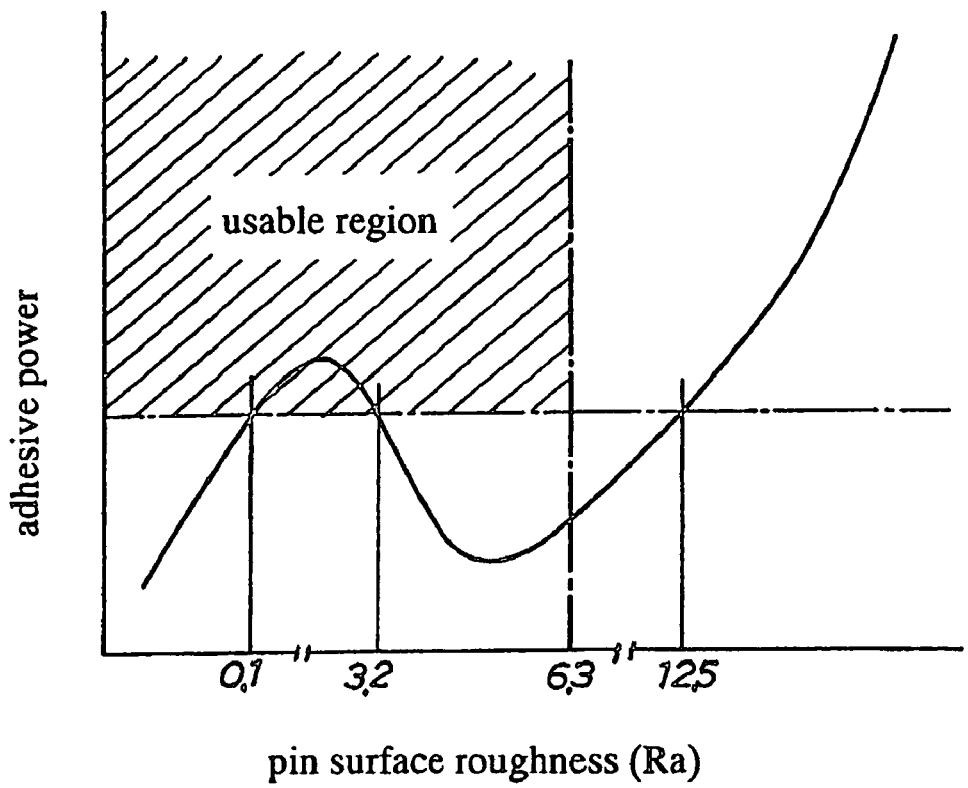
FIG. 25 is a graph showing a relationship between the surface roughness of a pin constituting the core for molding and the adhesive power of the pin to a wax molded article in a production method of lost wax type.

From the above description, it is preferable that the pin constituting the core for molding is one having a surface roughness Ra within the range from 0.1 to 3.2. From the view point of adhesion strength, the adhesion strength is preferably within the range from 0.1 kg to 2 kg. Regarding the surface roughness of the pin, the surface roughness may be one in a state that the pin itself has due to the molded state of the pin, or alternatively the surface of the pin having a surface roughness Ra of 0.1 or less may be subjected to a roughening treatment so that the adhesion strength will be within the range from 0.1 kg to 2 kg. In this case, at least a plurality of rough parts are present on the surface of the pin with a size and a depth of the rough parts being 0.005 mm to 0.2 mm, and the cross-sectional shape of the rough parts is an arbitrary one such as a circular shape, polygonal shape, ridge-like shape, or another shape. FIG. 25 shows, in a graph, a relationship of the adhesion strength between the wax molded article and the pin constituting the core for molding.

The shapes and sizes of the wax molded article and the pin constituting the core for molding are set in advance in relation to the shape and size of the hollow ceramic molded article to be produced. However, the size of the pin is preferably set by aiming at the size of the gap formed in the inside of the hollow ceramic molded article when the pin is drawn out from the wax molded article.

Namely, the size of the pin is set so that the gap formed in the inside of the hollow ceramic molded article when the pin is drawn out will be at least 1 vol % of the volume occupied by the wax molded article. If such a gap is ensured in the inside of the hollow ceramic molded article, the stress imposed on the inner circumferential side of the hollow ceramic molded article due to thermal expansion at the time of heating and melting the wax molded article can be greatly alleviated to restrain the deformation of the inner shape of the hollow ceramic molded article.

Example 1

In this Example, production methods of various systems (Examples and Comparative Examples) were adopted to produce a hollow ceramic molded article constituting a precursor, and this was baked to produce a discharge vessel for a high-pressure electric discharging lamp. With respect to the discharge vessels formed from precursors made of the hollow ceramic molded articles that are produced by various systems, evaluation was made on the variation of the inner volume of the inside space thereof and the presence or absence of cracks.

In the production of the hollow ceramic molded articles constituting a precursor, the production method of lost wax system according to one example of the present invention, which is a method shown in FIG. 20 and FIG. 21 (core 10*c* for molding, hollow ceramic 40*a*), is adopted as the first production method; a conventionally known production method of reduced-pressure molding system is adopted as the second production method; a conventionally known production method of water-absorbing molding system adopting an aqueous slurry and a mold made of plaster or the like is adopted as the third production method; and a conventionally known production method of assembling system in which the body part, the closed part, and the narrow pipe part are assembled with each other to assemble a container is adopted as the fourth production method.

Core for molding: In the core 10*c* for molding that was put to use, a tube-shaped hollow pin 14 having a surface roughness Ra within the range from 0.1 to 3.2 is adopted. Further, as a wax for forming the wax molded article 11, paraffins or aliphatic acid esters having a melting point within the range from 45° C. to 90° C. are adopted. Here, the wax molded article 11 was discharged from within the hollow ceramic molded article 40*a* in three hours by melting the wax molded article 11 at 100° C.

Slurry for molding: The slurry for molding for forming the hollow ceramic molded article 40a was prepared at room temperature of 20° C. by adding a ceramic powder, a gellifying agent, a reaction catalyst, and a cross-linking agent to a dispersion medium mixed with a dispersing agent. As the ceramic powder, alumina powder was adopted. As the dispersion medium, an ester (mass ratio of triacetylene:dimethyl glutarate was 10:90), which is a reactive dispersion medium, was adopted. The ester has a viscosity at 20° C. of 0.015 ps. As the gellifying agent, a uretodione-denatured product of hexamethylene. diisocyanate (HDI) was adopted. The HDI denatured product has a viscosity at 20° C. of 1.7 ps. As the reaction catalyst, triethylamine was adopted. As the cross-linking agent, polyester polyol was adopted. As the dispersing agent, a polymaleic acid copolymer was adopted. The prepared slurry has a viscosity of 5 ps or less.

Discharge vessels: The hollow ceramic molded articles which are the precursors produced by the production methods of the first production method (lost wax system) which is the production method according to the present invention, the second production method (reduced-pressure system) which is a conventionally known production method, the third production method (water-absorbing system) which is a conventionally known production method, and the fourth production method (assembling system) which is a conventionally known production method were baked under the same condition to produce discharge vessels. In baking the hollow ceramic molded articles, the hollow ceramic molded articles were calcined at 1200° C. in an ambient air atmosphere for three hours and then baked at 1850° C. in a hydrogen atmosphere for three hours. With regard to the discharge vessels formed by baking the hollow ceramic molded articles, comparison was made on the inner volume thereof and the state of the generated variations in the inner volume. The obtained results are shown in Table 8.

Here, in the discharge vessels shown in Table 8, the first discharge vessel shows a discharge vessel (Example) made by baking the hollow ceramic molded article produced by the first production method; the second discharge vessel shows a discharge vessel (Comparison Example) made by baking the hollow ceramic molded article produced by the second production method; the third discharge vessel shows a discharge vessel (Comparison Example) made by baking the hollow ceramic molded article produced by the third production method; and the fourth discharge vessel shows a discharge vessel (Comparison Example) made by baking the hollow ceramic molded article produced by the fourth production method. Further, the measured values are an average value of twenty discharge vessels.

TABLE 8

Evaluation of the discharge vessels

| type | characteristics | |
|---|---|---|
| | inner volume (cc) | variation (σ) |
| first discharge vessel | Average 0.300 | 0.007 |
| second discharge vessel | Average 0.286 | 0.015 |
| third discharge vessel | Average 0.295 | 0.017 |
| fourth discharge vessel | Average 0.297 | 0.012 |

Example 2

This Example is intended to confirm optimum cores for molding by making a study on the cores for molding that are put to use in the production of hollow ceramic molded articles constituting the precursors of discharge vessels. In this Example, a study was made on the core 10c for molding that is put to use in the production of the hollow ceramic molded article 40a constituting the precursor of the discharge vessel 30a.

The core 10c for molding is composed of a wax molded article 11 and a pin 14 made of metal and, as the wax constituting a material for forming the wax molded article 11, seven types of waxes D1 to D7 different from each other were adopted. The waxes D1 to D7 are the ones shown below, and have respectively different melting points and viscosities at the melting time, as shown in Table 9.

D1: paraffin wax
D2: sorbitan monostearate A
D3: wax for lost wax molding (containing a filler)
D4: wax for lost wax molding
D5: sorbitan monostearate B
D6: glycerine aliphatic acid ester
D7: propylene glycol monostearate In this Example, the above-described waxes were used as materials for molding the wax molded articles 11, and the cores 10c for molding were produced on the basis of the methods of producing a core for molding shown in FIG. 17. The produced cores 10c for molding were put to use for the production of hollow ceramic molded articles, and the hollow ceramic molded articles 40a were produced on the basis of the methods of producing a hollow ceramic molded article shown in FIG. 20 and FIG. 21. During this period, the shapes of the cores 10c for molding were evaluated, and the eluted states of the wax molded articles 11 located in the hollow ceramic molded articles 40a were evaluated.

TABLE 9

Evaluation of the waxes constituting the wax molded articles

| type | melting point (°) | viscosity at the melting time (poise) | evaluation of the core | evaluation of the eluted state |
|---|---|---|---|---|
| D1 | 60 | <5 | X | ○ |
| D2 | 38 | <5 | Δ | ○ |
| D3 | 70 | 20 | ○ | X |
| D4 | 55 | 10 | ○ | Δ |
| D5 | 55 | <5 | ○ | ○ |
| D6 | 58 | <5 | ○ | ○ |
| D7 | 45 | <5 | ○ | ○ |

(Notes)
○ symbol: evaluation is good
Δ symbol: evaluation is pass
X symbol: evaluation is failure Regarding the melting point of the wax constituting the wax molded article 11 of the core 10c for molding, the melting point is 30° C. to 80° C., preferably 40° C. to 79° C. If the melting point of the wax is low, the wax molded article is liable to be deformed at an ordinary temperature, so that the hollow ceramic molded articles 40a having a high shape precision cannot be repeatedly molded. Further, if the melting point of the wax is high, one must impart a high temperature at the time of eluting the wax molded article 11 from within the hollow ceramic molded article 40a, and also the hollow ceramic molded articles 40*a* are exposed to a high temperature. For this reason, a large strain is added to the hollow ceramic molded article 40*a* by expansion of the solvent or the like in the hollow ceramic molded article 40*a*, or by large expansion of the wax, or else by the shrinkage due to drying caused by evaporation of the solvent, thereby raising an inconvenience such as generation of cracks.

Regarding the viscosity at melting of the wax constituting the wax molded article 11 of the core 10*c* for molding, the viscosity is 10 ps or less, preferably 5 ps or less. In the production of the hollow ceramic molded article 40*a* integrally having a hollow body part 41 and narrow pipe parts 42, 43, the wax molded article 11 remaining in the body part 41 of the hollow ceramic molded article 40*a* must be eluted through an inner hole of the narrow pipe parts 42, 43 of the hollow ceramic molded articles 40*a*. In order to carry out such an eluting means smoothly, the above-described viscosity is preferable.

Regarding the degree of volume shrinkage of the wax constituting the wax molded article 11 of the core 10*c* for molding, the volume expansion ratio by molten-solid phase transition is preferably 5% or less. In order to obtain this volume expansion ratio, the wax is preferably an aliphatic acid ester such as a glycerine acid ester or sorbitan aliphatic acid ester. By obtaining this volume expansion ration, needless strain is prevented from being added to the hollow ceramic molded article 40*a* at the time of eluting the wax molded article.

Example 3

This Example is intended to confirm optimum slurries for molding by making a study on the slurries for molding constituting the source materials for molding that are put to use in the production of hollow ceramic molded articles constituting the precursors of discharge vessels. In this Example, a study was made on the dispersing agent in the slurries for molding that are put to use in the production of the hollow ceramic molded article 40*a* constituting the precursor of the discharge vessel 30*a*.

The basic composition of the slurries for molding was set to contain alumina powder (trade name, Alumina AKP-20, manufactured by Sumitomo Chemical Industry Co., Ltd.) at 100 wt %, dispersion medium (trade name, CHEMREZ 6080, manufactured by Hodogaya Ashland Co., Ltd.) at 27 wt %, gellifying agent (trade name, SBU isocyanate 0775, manufactured by Sumitomo Bayer Urethane Co., Ltd.) at 4 wt %, reaction catalyst (trade name, Kaolizer No. 25, manufactured by Kao Co., Ltd.) at 0.1 wt %, and magnesia at 0.025 wt %. For preparation, a dispersing agent (trade name, MALIALIM AKM-0531, manufactured by Nippon Yushi Co., Ltd.) was added in suitable amounts to a slurry for molding having such a composition.

With the use of the prepared slurries for molding as a molding source material, a hollow ceramic molded article 40*a* which is a precursor of a discharge vessel 30*a* was molded on the basis of the molding method shown in FIG. 20 and FIG. 21. Evaluation was made on the viscosity at 25° C. of the slurries for molding and the strength ($\phi$8 bar/three-point bending) of the hollow ceramic molded article one hour after the molding. The obtained results are shown in Table 10.

TABLE 10

Evaluation of dispersing agent

| content of dispersing agent | viscosity of slurry (poise/25° C.) | | strength of molded article (kg) | | total |
|---|---|---|---|---|---|
| (wt %) | viscosity | evaluation | strength | evaluation | evaluation |
| 1.2 | 8.2 | X | 0.1 | X | X |
| 1.5 | 3.8 | Δ | 0.5 | X | X |
| 2.0 | 2.5 | ○ | 1.0 | Δ | Δ |
| 2.5 | 2.7 | ○ | 1.2 | Δ | ○ |
| 3.0 | 3.1 | Δ | 1.6 | ○ | ○ |
| 3.5 | 3.3 | ○ | 1.9 | ○ | ○ |
| 4.0 | 3.6 | Δ | 2.0 | ○ | Δ |

(Notes)
○ symbol: evaluation is good
Δ symbol: evaluation is pass
X symbol: evaluation is failure The dispersing agent in the slurry for molding functions to improve the fluidity characteristics of the slurry by enhancing the dispersive fraction of the source material powder and contributes to an improvement in the strength of the hollow ceramic molded article. The amount of addition of the dispersing agent greatly affects the fluidity characteristics of the slurry for molding. Though being related also to the powder characteristics such as type, particle size, and specific surface area of the source material powder to be adopted, the amount of addition is generally aimed at 0.1 wt % to 5.0 wt % relative to the source material powder to be adopted.

In this Example, in view of the fluidity characteristics (viscosity) of the slurry for molding, good results have been obtained when the amount of addition of the alumina powder is within the range from 1.5 wt % to 4.0 wt %, and the most preferable range is the range from 1.5 wt % to 2.5 wt %. Further, in view of the strength of the molded article, good results have been obtained when the amount of addition relative to the alumina powder is within the range of 2.0 wt % or more, and the most preferable range is the range of 2.5 wt % or more. In all, the amount of addition relative to the alumina powder is within the range from 2.0 wt % to 4.0 wt %.

Like the dispersion medium, the dispersing agent preferably has a reactive functional group. A dispersing agent having a reactive functional group (reactive dispersing agent) promotes the curing of the slurry by being involved in the gellifying reaction together with the dispersion medium. A dispersing agent generally has a higher molecular weight than a dispersion medium or the like constituting the slurry for molding, and has a larger number of reactive functional groups in one molecule. For this reason, when a dispersing agent is involved in the gellifying reaction, the dispersing agent improves the curing speed of the slurry for molding, and also improves the curing hardness. An improvement in the curing characteristics is recognized when the dispersing agent is a dispersing agent having an amino group, a dispersing agent having an acid anhydride or a carboxylic group, or a dispersing agent having a hydroxyl group.

Regarding the reactive dispersing agent, the curing characteristics of the slurry for molding are improved and one can obtain a hollow ceramic molded article 40*a* having good characteristics according as the amount of addition of the dispersing agent is increased. However, when the amount of addition of the dispersing agent exceeds a suitable amount, the fluidity characteristics of the slurry for molding decreases. For this reason, a suitable amount of addition exists for the dispersing agent. The optimal amount of addition for the fluidity characteristics of the dispersing agent does not necessarily coincide with the optimal amount of addition for the curing characteristics. Therefore, for the optimal amount of addition of the dispersing agent, one needs to determine a suitable value for each of the source material powders to be adopted. Generally, the optimal amount of addition is set to be within the range of one to two times of the amount of addition by which the viscosity attains its minimum. Namely, the amount of addition of the dispersing agent is from 0.1 wt % to 5 wt % of the source material powder.

Example 4

This Example is intended to confirm optimum slurries for molding by making a study on the slurries for molding constituting the source materials for molding that are put to use in the production of hollow ceramic molded articles constituting the precursors of discharge vessels. In this Example, a study was made on the metal component in the slurries for molding that are put to use in the production of the hollow ceramic molded article 40a constituting the precursor of the discharge vessel 30a.

The basic composition of the slurries for molding was set to contain alumina powder (trade name, Alumina AKP-20, manufactured by Sumitomo Chemical Industry Co., Ltd.) at 100 wt %, dispersion medium (trade name, CHEMREZ 6080, manufactured by Hodogaya Ashland Co., Ltd.) at 27 wt %, gellifying agent (trade name, SBU isocyanate 0775, manufactured by Sumitomo Bayer Urethane Co., Ltd.) at 4 wt %, reaction catalyst (trade name, Kaolizer No. 25, manufactured by Kao Co., Ltd.) at 0.1 wt %, and dispersing agent (trade name, MALIALIM AKM-0531, manufactured by Nippon Yushi Co., Ltd.) at 2.0 wt %. For preparation, magnesia was added in suitable amounts to a slurry for molding having such a composition.

With the use of the prepared slurries for molding as a molding source material, a hollow ceramic molded article 40a which is a precursor of a discharge vessel 30a was molded on the basis of the molding methods shown in FIG. 20 and FIG. 21. Evaluation was made on the strength ($\phi$8 bar/three-point bending) with time of the hollow ceramic molded articles 40a. The obtained results are shown in Table 11.

TABLE 11

Evaluation of metal component (MgO)

| content of MgO (wt %) | strength of molded article (kg) | | |
|---|---|---|---|
| | after one hour | after two hours | after four hours |
| 0.005 | 0.2 | 0.7 | 1.2 |
| 0.01 | 0.6 | 1.0 | 1.3 |
| 0.03 | 1.0 | 1.3 | 1.4 |
| 0.08 | 1.2 | 1.4 | 1.5 |

A metal component of some kind (such as metal or metal oxide) in the slurry for molding functions to improve the light-transmitting characteristics of the discharge vessel 30a made by baking the hollow ceramic molded article 40a. For this reason, it is preferable that the metal component is a constituent component of the slurry for molding. As the metal component, one can mention metals such as Mg, Y, Zr, Sc, and La, and metal oxides such as magnesia (MgO), yttria ($Y_2O_3$), and zirconia ($ZrO_2$) These metal oxides promote the curing by aiding the gellification of the slurry for molding and also functions to enhance the curing hardness of the slurry for molding. Further, in many cases, the slurry for molding contains metal components such as Si, B, Na, Cu, Fe, and Ca.

In this Example, magnesia (MgO) was adopted as a representative example of these metal components, and a study was made on the influence given to the curing of the slurry for molding and on the influence given to the strength of the obtained hollow ceramic molded article 40a. Regarding the curing of the slurry for molding, if the content of magnesia is 0.02 wt % or less, the curing speed of the slurry for molding will be slow, and the period of time till the hollow ceramic molded article 40a gains a sufficient strength for releasing will be long. Further, if the content of magnesia is 0.15 wt % or more, growth of abnormal grains is provoked in the alumina constituting the hollow ceramic molded article 40a at the time of baking the hollow ceramic molded article 40a, thereby causing generation of cracks. Here, approximately the same applies to the other metals as well. Therefore, the content of these metal components in the slurry for molding is within the range from 0.02 wt % to 0.15 wt %, preferably within the range from 0.05 wt % to 0.1 wt %.

EXPLANATION OF REFERENCE NUMERALS 1 outer mold
2 core
3 slurry
4 molded article
5 outer mold
6 core
6a first member
6b second member
7 molded article
8 outer mold
9 core
10a1, 10a2 first core for molding
10b1, 10b2 second core for molding
10c third core for molding
10d fourth core for molding
10e fifth core for molding
10f sixth core for molding
10g seventh core for molding
11, 17 wax molded article
11a gap
12, 13a, 13b, 14, 15a, 15b, 16a, 16b, 18 pin
14a, 15c, 16c, 18a ejection outlet
14b, 18b opening part on one end
20a, 20b, 20c forming mold
21, 22 mold
21a injection hole
23 space part
24 cavity
30a, 30b discharge vessel
31 body part
32, 33 narrow pipe part
40a, 40b hollow ceramic molded article(precursor)
40b1 group
41 body part
42, 43 narrow pipe part
50a, 50b forming mold
51, 52, 55, 56 mold
51a slurry injection hole
53, 54 space part
57 injection hole
S slurry

The invention claimed is:

1. A core for molding constituting a forming mold for molding a hollow ceramic molded article integrally having a hollow body part and a narrow pipe part, the core for molding comprising:
- a mold core article comprising one of wax and a waxy substance and having an outer shape corresponding to an inner shape of the hollow body part of the hollow ceramic article to be molded; and
- a pin, having an outer shape corresponding to an inner shape of the narrow pipe part of the hollow ceramic article to be molded, pierced through the mold core article to protrude therefrom;
- wherein the one of the wax and the waxy substance constituting the mold core article has a melting point within a range from 30° C. to 80° C., a viscosity at melting of 10 ps or less, and a volume change ratio by molten-solid phase transition of 5% or less.

2. The core for molding according to claim 1, wherein the pin of the core for molding is a solid pin.

3. The core for molding according to claim 1, wherein the pin of the core for molding is a pipe-shaped hollow pin.

4. The core for molding according to claim 3, wherein the hollow pin is closed on at least one end thereof.

5. The core for molding according to claim 3, wherein the hollow pin is open on at least one end and includes an ejection outlet for the one of the wax and the waxy substance that constitutes the mold core article at a position corresponding to a joining portion of the hollow pin and the mold core article.

6. A core for molding for simultaneously molding a plurality of hollow ceramic molded articles integrally having a hollow body part and a narrow pipe part, the core for molding comprising:
- a plurality of mold core articles, each comprising one of wax and a waxy substance and having an outer shape corresponding to an inner shape of the hollow body part of the hollow ceramic articles to be molded; and
- a long pin, having an outer shape corresponding to an inner shape of the narrow pipe part of the hollow ceramic articles to be molded, serially piercing through the mold core articles to join the pin therewith;
- wherein the pin is a pipe-shaped hollow pin and includes ejection outlets for the one of the wax and the waxy substance of the mold core articles at positions corresponding to joining portions of the hollow pin and the mold core articles; and
- wherein the one of the wax and the wax substance of the mold core articles has a melting point within a range from 30° C. to 80° C., a viscosity at melting of 10 ps or less, and a volume change ratio by molten-solid phase transition of 5% or less.

7. The core for molding according to claim 6, wherein the hollow pin of the core for molding is closed on at least one end.

8. The core for molding according to claim 1, wherein the pin of the core for molding is a hollow pin that is open on at least one end and which includes ejection outlets for the one of the wax and the waxy substance constituting the mold core article at a position corresponding to a joining portion of thehollow pin and the mold core article.

9. The core for molding according to claim 1, wherein the pin of the core for molding has a surface roughness (Ra) of 0.1 to 3.2.

10. The core for molding according to claim 1, wherein the pin of the core for molding has an adhesion strength of 0.1 kg to 2 kg with respect to the one of the wax and the waxy substance constituting the mold core article.

11. The core for molding according to claim 1, wherein a gap in the mold core article, formed by drawing out the pin of the core for molding, is at least 1 vol % of the total volume occupied by the hollow ceramic molded article.

* * * * *